(12) United States Patent
Su et al.

(10) Patent No.: US 11,975,444 B2
(45) Date of Patent: May 7, 2024

(54) VARIABLE STIFFNESS ROBOTIC GRIPPER BASED ON LAYER JAMMING

(71) Applicant: Ohio State Innovation Foundation, Columbus, OH (US)

(72) Inventors: Haijun Su, Plain City, OH (US); Yuan Gao, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 18/312,609

(22) Filed: May 5, 2023

(65) Prior Publication Data

US 2023/0381977 A1 Nov. 30, 2023

Related U.S. Application Data

(63) Continuation of application No. 17/144,814, filed on Jan. 8, 2021, now Pat. No. 11,679,514.

(60) Provisional application No. 62/958,360, filed on Jan. 8, 2020.

(51) Int. Cl.
*B25J 15/12* (2006.01)
*B25J 15/10* (2006.01)

(52) U.S. Cl.
CPC ............. *B25J 15/12* (2013.01); *B25J 15/103* (2013.01)

(58) Field of Classification Search
CPC ................................ B25J 15/12; B25J 15/103
See application file for complete search history.

(56) References Cited

U.S. PATENT DOCUMENTS

| | | | | |
|---|---|---|---|---|
| 3,343,864 A * | 9/1967 | Baer | ........................ | B25J 15/12 92/92 |
| 3,981,528 A * | 9/1976 | Andorf | ................ | B25J 15/0023 92/92 |
| 6,484,601 B1 * | 11/2002 | Arrichiello | ................ | B25J 9/14 92/37 |
| 7,617,762 B1 * | 11/2009 | Ragner | ...................... | F16J 3/06 92/37 |
| 10,093,023 B2 * | 10/2018 | Lessing | ................ | B25J 15/0023 |
| 10,189,168 B2 * | 1/2019 | Lessing | ................ | B25J 15/0071 |
| 11,679,514 B2 * | 6/2023 | Su | .......................... | B25J 15/103 294/198 |
| 2003/0110938 A1 * | 6/2003 | Seto | ........................ | B25J 15/12 92/92 |

\* cited by examiner

*Primary Examiner* — Stephen A Vu

(74) *Attorney, Agent, or Firm* — Meunier Carlin & Curfman LLC

(57) ABSTRACT

A finger for a robotic gripper may include a flexible backbone, a plurality of jamming layers, and a membrane bag. The backbone may have a first side, a second side, a third side, and a fourth side. The backbone may include a flexible beam, and a plurality of branches attached to the flexible beam and spaced apart from one another. Each branch may include a first end surface extending along the first side, and a second end surface extending along the second side. The first end surfaces may collectively extend along a majority of the first side, and the second end surfaces may collectively extend along a majority of the second side. The jamming layers may be positioned along the third side or the fourth side. The membrane bag may be positioned over the jamming layers.

20 Claims, 15 Drawing Sheets

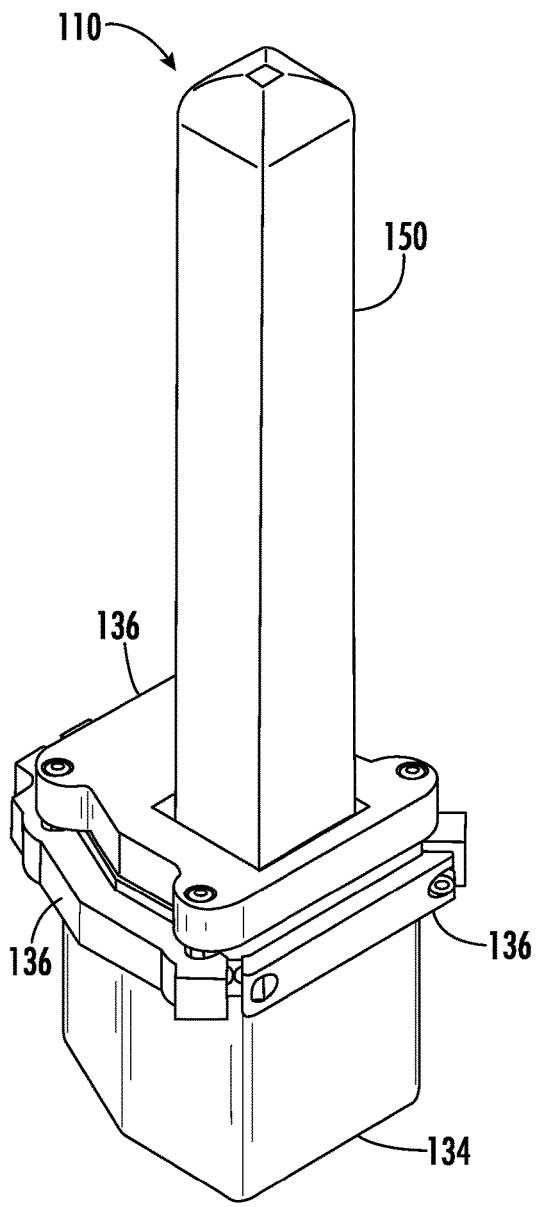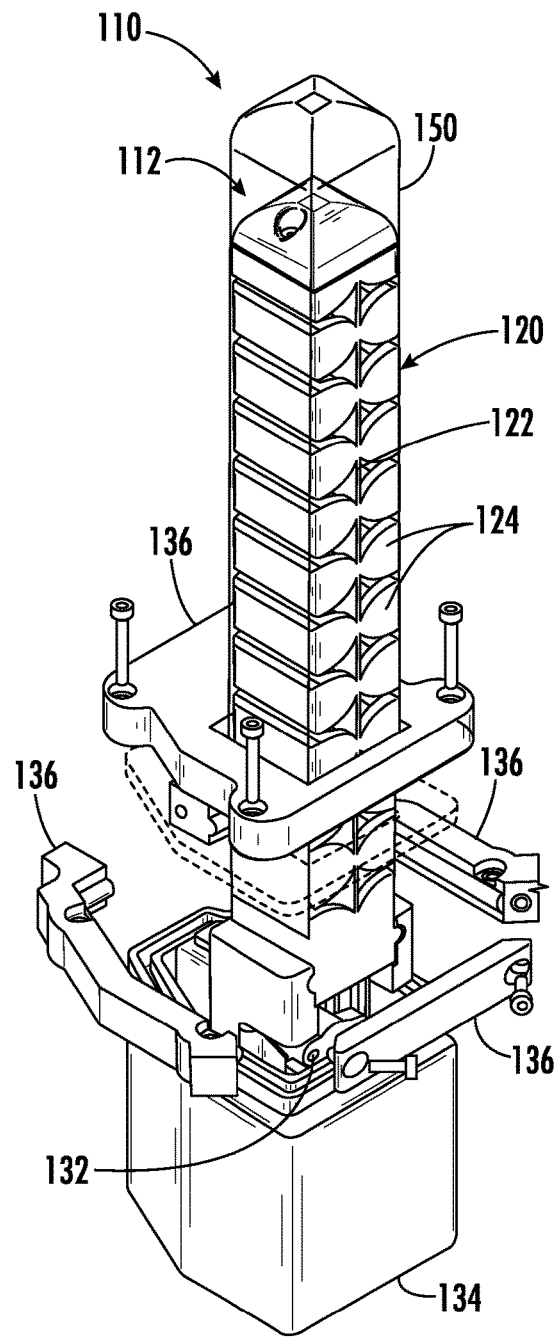
FIG. 1B
FIG. 1C

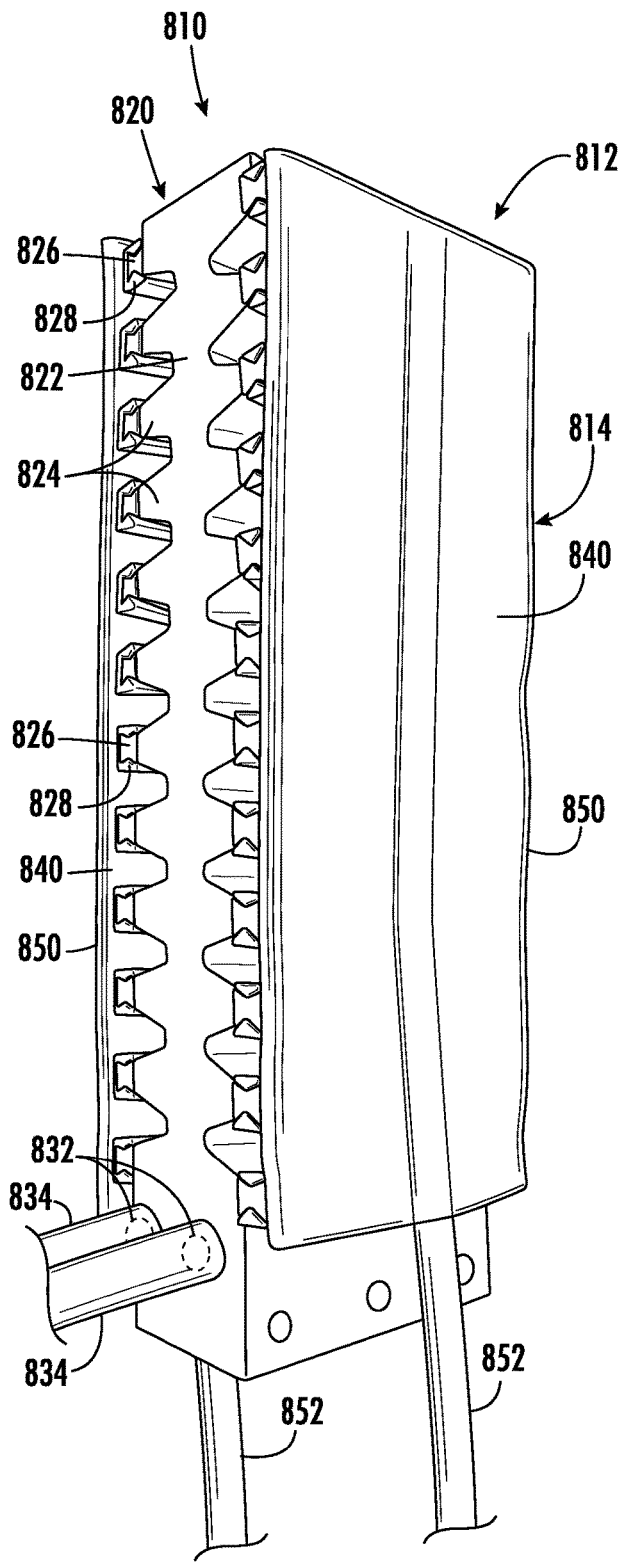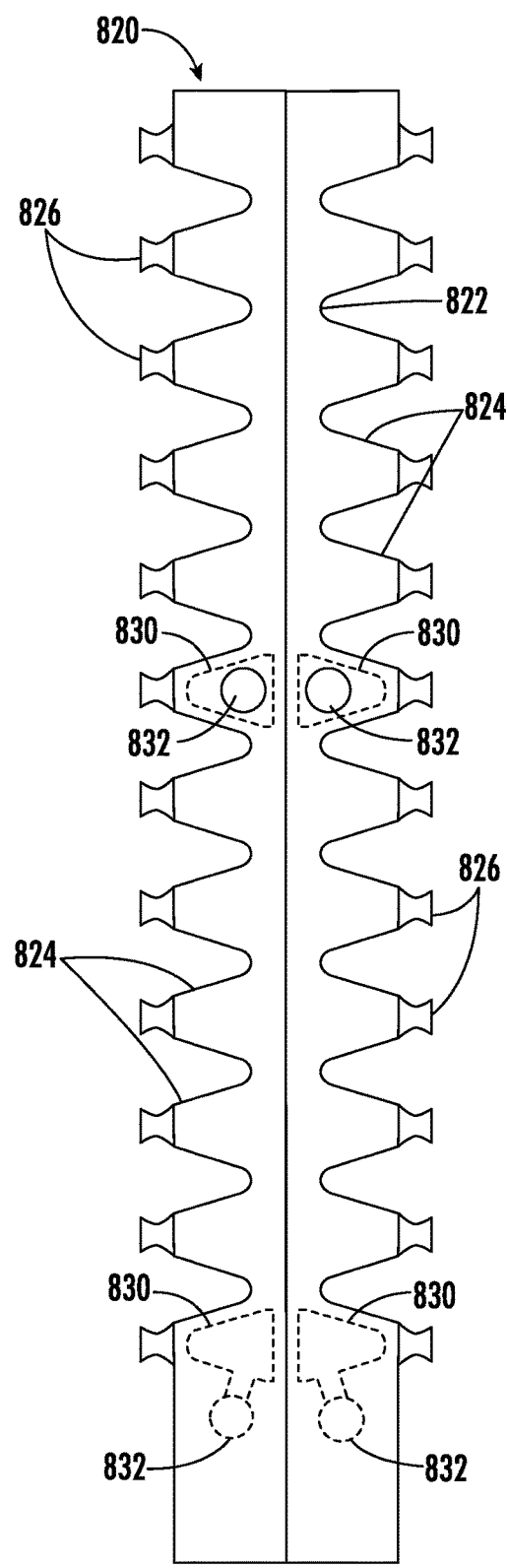
FIG. 8A
FIG. 8B

VARIABLE STIFFNESS ROBOTIC GRIPPER BASED ON LAYER JAMMING

CROSS-REFERENCE TO RELATED APPLICATIONS

This application claims priority to and the benefit of U.S. Provisional Patent Application No. 62/958,360, filed on Jan. 8, 2020, the disclosure of which is expressly incorporated herein by reference in its entirety.

GOVERNMENT SUPPORT CLAUSE

This invention was made with government support under award 1637656 awarded by the National Science Foundation. The government has certain rights in the invention.

FIELD OF THE DISCLOSURE

The present disclosure relates generally to robotics and more particularly to variable stiffness robotic grippers based on layer jamming.

BACKGROUND OF THE DISCLOSURE

Robots are widely considered as one of the key technologies for numerous fields ranging from manufacturing to medicine to scientific exploration. Conventional hard robots typically are formed by rigid links with 3-6 discrete joints, aiming for high performance (speed, payload, and accuracy) desired for industrial applications. On the other hand, recently-emerging soft/compliant robots are made of highly deformable materials for tasks in unstructured environments that require a larger configuration space. Compared with their conventional hard counterparts, robots made up of compliant material and structure have many advantages including adaptability, flexibility, durability, and safety to environment. See Rus, D. et al., Design, Fabrication and Control of Soft Robots, *Nature,* 521(7553), pp. 467-475, May 2015; Trivedi, D. et al., Soft Robotics: Biological Inspiration, State of the Art, and Future Research, 2008.

Grippers are one kind of robotic manipulator meant for grasping and manipulating objects. Although there are many existing grippers that provide good and stable performance with objects having certain shapes, dealing with irregular objects in an unstructured environment remains challenging. See Brown, E. et al., Universal Robotic Gripper Based on the Jamming of Granular Material, *Proceedings of the National Academy of Sciences,* 107(44), pp. 18809-18814, November 2010. When it comes to grasping irregular and/or fragile objects, rigid grippers may not work as well and may even destroy the grasped object. Current rigid grippers based on a multi-finger design require many controllable joints to realize high degree-of-freedom, many force sensors to ensure a safe operation and prevent the gripper from crushing the object, and a demanding computational power to decide the magnitude and position of each finger's stress, which introduces a high level of hardware and software complexity. Compliant robotic grippers could be an alternative for gripping tasks owing to their advantages such as low weight, high adaptability without need for complicated control methods, being inherently safe for humans, robustness under impact or collision, and low cost. See Wood, R. et al., Smaller, Softer, Safer, Smarter Robots, *Science Translational Medicine,* 5(210), pp. 210ed19-210ed19, November 2013. However, due to the compliant nature of the material and structure used, compliant grippers generally cannot bear much load and cannot be controlled precisely. See Manti, M. et al., Stiffening in Soft Robotics: A Review of the State of the Art, *IEEE Robotics Automation Magazine,* 23(3), pp. 93-106, September 2016.

To improve the load capacity of compliant grippers, researchers have put forward several variable stiffness methods which are applied in design and control of mechanisms to tune stiffness. For example, a linkage mechanism with tunable rigidity has been developed to realize 3.6 times change in stiffness, but this method requires linkage, motors and other components which increase the structural complexity. See She, Y. et al., Design and Prototype of a Tunable Stiffness Arm for Safe Human-Robot Interaction, *ASME 2016 International Design Engineering Technical Conferences and Computers and Information in Engineering Conference,* pp. V05BT07A063-V05BT07A063, 2016. Another method employs a low melting point alloy to achieve a 25-fold stiffness change. See Schubert, B. E. et al., Variable Stiffness Material Based on Rigid Low-Melting-Point-Alloy Microstructures Embedded in Soft Poly(dimethylsiloxane) (PDMS), *RSC Advances,* 3(46), pp. 24671-24679, November 2013. However, melting alloy is time consuming, and alloys tend to fracture at low strain amounts, which makes this approach unsuitable for the actuator. Magnetorheological elastomer that can be controlled by a magnetic field is another material that has been adopted to implement tunable stiffness and already has been used to adjust the spring constant of vibration absorbers. See Deng, H.-X. et al., Development of an Adaptive Tuned Vibration Absorber with Magnetorheological Elastomer, *Smart Materials and Structures,* 15(5), pp. N111-N116, August 2006. This technique demands an extremely flexible elastomer, and it is difficult to pack electromagnets in moving parts, resulting in construct problems and difficulty in applying the technique in an actuator.

Material jamming, including granular jamming and layer jamming, is another technique employed to achieve tunable stiffness. Jamming structures used to vary stiffness in compliant mechanisms consist of a sealed volume filled with either granular material or sheets of materials. In the jamming process, numerous small pieces of material initially in a loose state contract under external actuation, which is usually a negative pressure, and transform to a solid-like tight state. Such technique is called granular jamming or layer jamming, respectively, according to different forms of material used. Research has been conducted on granular jamming in form of robotic joints (see Hauser, S. et al., JammJoint: A Variable Stiffness Device Based on Granular Jamming for Wearable Joint Support, *IEEE Robotics and Automation Letters,* 2(2), pp. 849-855, April 2017) and manipulators (see Brown, E. et al.; Cheng, N. G. et al., Design and Analysis of a Robust, Low-cost, Highly Articulated Manipulator Enabled by Jamming of Granular Media). Layer jamming shows good performance in many applications. For example, a manipulator for minimally invasive use was developed, taking advantage of variable stiffness to ensure the safety of patient. See Kim, Y. et al., Design of a Tubular Snake-like Manipulator with Stiffening Capability by Layer Jamming, *2012 IEEE/RSJ International Conference on Intelligent Robots and Systems,* pp. 4251-4256, 2012; Kim, Y. et al., A Novel Layer Jamming Mechanism with Tunable Stiffness for Minimally Invasive Surgery, *IEEE Transactions on Robotics,* 29(4), pp. 1031-1042, August 2013. Another soft pneumatic actuator used a layer jamming technique to reach an 8-fold increase in stiffness. See Wall, V. et al., Selective Stiffening of Soft Actuators Based on Jamming, 2015 *IEEE International Conference on*

*Robotics and Automation (ICRA)*, pp. 252-257, 2015. A pneumatic variable stiffness gripper based on layer jamming also has been developed to achieve a 4.6 times increase in output force for a single finger. See Lin, K.-Y. et al., Soft Fingers with Controllable Compliance to Enable Realization of Low Cost Grippers, *Biomimetic and Biohybrid Systems*, pp. 544-550, 2017. Recent research on layer jamming includes designing a new backbone structure to which layers could be attached (see Santiago, J. L. C. et al., Soft Robots and Kangaroo Tails: Modulating Compliance in Continuum Structures Through Mechanical Layer Jamming; Deshpande, A. R. et al., Origami-inspired Bi-directional Soft Pneumatic Actuator with Integrated Variable Stiffness Mechanism, $18^{th}$ *International Conference on Advanced Robotics (ICAR)*, pp. 417-421, 2017) and medical applications (see Hadi Sadati, S. M. et al., Stiffness Control of Soft Robotic Manipulator for Minimally Invasive Surgery (MIS) Using Scale Jamming, *Intelligent Robotics and Applications*, pp. 141-151, 2015; Tognarelli, S. et al., Soft Tool for Gallbladder Retraction in Minimally Invasive Surgery Based on Layer Jamming, $7^{th}$ *IEEE International Conference on Biomedical Robotics and Biomechatronics (Biorob)*, pp. 67-72, 2018). Although granular jamming is easier to fabricate, layer jamming can make more effective use of pressure and demand less volume to work, which attributes make layer jamming a good choice for an actuator.

A need therefore exists for improved variable stiffness robotic grippers and methods for grasping and manipulating objects, such as irregular objects in an unstructured environment.

SUMMARY OF THE DISCLOSURE

The present disclosure provides variable stiffness robotic grippers based on layer jamming and related methods of using such grippers for grasping and manipulating objects.

In one aspect, a finger for a robotic gripper is provided. In one embodiment, the finger may include a flexible backbone, a plurality of jamming layers, and a membrane bag. The backbone may have a first end, a second end positioned opposite the first end, a first side, a second side positioned opposite the first side, a third side, and a fourth side positioned opposite the third side. The backbone may include a flexible beam extending in a direction from the first end toward the second end of the backbone, and a plurality of branches attached to the flexible beam and spaced apart from one another. Each branch may include a first end surface extending along the first side of the backbone, a second end surface extending along the second side of the backbone, and a side surface extending along the third side or the fourth side of the backbone. The first end surfaces of the branches may collectively extend along a majority of the first side of the backbone, and the second end surfaces of the branches may collectively extend along a majority of the second side of the backbone. The jamming layers may be positioned along the third side or the fourth side of the backbone and may extend over respective side surfaces of the branches. The membrane bag may be positioned over the jamming layers.

In some embodiments, the first end surfaces and the second end surfaces of the branches each may define an end profile having one or more curved edges. In some embodiments, the first end surfaces and the second end surfaces of the branches each may define an end profile having a semi-elliptical shape. In some embodiments, the first end surfaces of the branches may collectively extend along at least 70% of the first side of the backbone, and the second end surfaces of the branches may collectively extend along at least 70% of the second side of the backbone. In some embodiments, the flexible beam and the branches may be integrally formed with one another. In some embodiments, the flexible beam may be centrally positioned between the third side and the fourth side of the backbone. In some embodiments, the plurality of branches may include a first set of branches each extending from the flexible beam to the third side of the backbone, and a second set of branches each extending from the flexible beam to the fourth side of the backbone. In some embodiments, the flexible beam may be offset toward the third side or the fourth side of the backbone. In some embodiments, the flexible beam may extend along one of the third side or the fourth side of the backbone. In some embodiments, the branches each may extend from the flexible beam to the other of the third side or the fourth side of the backbone, and the jamming layers each may be positioned along the other of the third side or the fourth side of the backbone. In some embodiments, the finger also may include a cable extending through each of the branches, and a servo motor coupled to the cable. In some embodiments, the membrane bag may be positioned over the backbone and the jamming layers.

In some embodiments, the first end surfaces and the second end surfaces of the branches each may define an end profile having a trapezoidal shape. In some embodiments, the membrane bag may be positioned along the third side or the fourth side of the backbone, and the membrane bag may be connected to the backbone by a plurality of first connectors of the backbone and a plurality of second connectors attached to the membrane bag. In some embodiments, the finger also may include a tube attached to the membrane bag and in fluid communication with an interior of the membrane bag, and a vacuum pump attached to the tube and configured for applying negative pressure to the interior of the membrane bag to increase frictional forces between the jamming layers. In some embodiments, the backbone also may include one or more channels defined within one or more of the branches, and one or more openings extending through the backbone and in fluid communication with the one or more channels. In some embodiments, the finger also may include one or more tubes attached to the backbone and in fluid communication with the one or more channels. In some embodiments, the finger also may include one or more vacuum pumps attached to the one or more tubes and configured for applying negative pressure or positive pressure to the one or more channels to bend the backbone. In some embodiments, the one or more channels may include a first channel defined in a first branch extending from the flexible beam to the third side of the backbone, and a second channel defined in a second branch extending from the flexible beam to the third side of the backbone, with the second channel being in fluid isolation from the first channel. In some embodiments, the one or more channels may include a first channel defined in a first set of branches each extending from the flexible beam to the third side of the backbone, and a second channel defined in a second set of branches each extending from the flexible beam to the third side of the backbone, with the second channel being in fluid isolation from the first channel.

In another aspect, a finger for a robotic gripper is provided. In one embodiment, the finger may include a flexible backbone, a plurality of jamming layers, a cable, and a membrane bag. The backbone may have a first end, a second end positioned opposite the first end, a first side, a second side positioned opposite the first side, a third side, and a fourth side positioned opposite the third side. The backbone may include a flexible beam extending in a direction from the first end toward the second end of the backbone, and a plurality of branches attached to the flexible beam and spaced apart from one another. Each branch may include a first end surface extending along the first side of the backbone, a second end surface extending along the second side of the backbone, and a side surface extending along the third side or the fourth side of the backbone. The first end surfaces of the branches may collectively extend along a majority of the first side of the backbone, and the second end surfaces of the branches may collectively extend along a majority of the second side of the backbone. The jamming layers may be positioned along the third side or the fourth side of the backbone and may extend over respective side surfaces of the branches. The cable may extend through each of the branches. The membrane bag may be positioned over the backbone and the jamming layers.

In some embodiments, the first end surfaces and the second end surfaces of the branches each may define an end profile having one or more curved edges. In some embodiments, the first end surfaces and the second end surfaces of the branches each may define an end profile having a semi-elliptical shape. In some embodiments, the first end surfaces of the branches may collectively extend along at least 70% of the first side of the backbone, and the second end surfaces of the branches may collectively extend along at least 70% of the second side of the backbone. In some embodiments, the flexible beam and the branches may be integrally formed with one another. In some embodiments, the flexible beam may be centrally positioned between the third side and the fourth side of the backbone. In some embodiments, the plurality of branches may include a first set of branches each extending from the flexible beam to the third side of the backbone, and a second set of branches each extending from the flexible beam to the fourth side of the backbone. In some embodiments, the flexible beam may be offset toward the third side or the fourth side of the backbone. In some embodiments, the flexible beam may extend along one of the third side or the fourth side of the backbone. In some embodiments, the branches each may extend from the flexible beam to the other of the third side or the fourth side of the backbone, and the jamming layers each may be positioned along the other of the third side or the fourth side of the backbone.

In another aspect, a finger for a robotic gripper is provided. In one embodiment, the finger may include a flexible backbone, a plurality of jamming layers, a cable, and a membrane bag. The backbone may have a first end, a second end positioned opposite the first end, a first side, a second side positioned opposite the first side, a third side, and a fourth side positioned opposite the third side. The backbone may include a flexible beam extending in a direction from the first end toward the second end of the backbone, and a plurality of branches attached to the flexible beam and spaced apart from one another. Each branch may include a first end surface extending along the first side of the backbone, a second end surface extending along the second side of the backbone, and a side surface extending along the third side or the fourth side of the backbone. The first end surfaces and the second end surfaces of the branches each may define an end profile having one or more curved edges. The jamming layers may be positioned along the third side or the fourth side of the backbone and may extend over respective side surfaces of the branches. The cable may extend through each of the branches. The membrane bag may be positioned over the backbone and the jamming layers.

In some embodiments, the first end surfaces and the second end surfaces of the branches each may define an end profile having a semi-elliptical shape. In some embodiments, the first end surfaces of the branches may collectively extend along a majority of the first side of the backbone, and the second end surfaces of the branches may collectively extend along a majority of the second side of the backbone. In some embodiments, the first end surfaces of the branches may collectively extend along at least 70% of the first side of the backbone, and the second end surfaces of the branches may collectively extend along at least 70% of the second side of the backbone. In some embodiments, the flexible beam and the branches may be integrally formed with one another. In some embodiments, the flexible beam may be centrally positioned between the third side and the fourth side of the backbone. In some embodiments, the plurality of branches may include a first set of branches each extending from the flexible beam to the third side of the backbone, and a second set of branches each extending from the flexible beam to the fourth side of the backbone. In some embodiments, the flexible beam may be offset toward the third side or the fourth side of the backbone. In some embodiments, the flexible beam may extend along one of the third side or the fourth side of the backbone. In some embodiments, the branches each may extend from the flexible beam to the other of the third side or the fourth side of the backbone, and the jamming layers each may be positioned along the other of the third side or the fourth side of the backbone.

In still another aspect, a finger for a robotic gripper is provided. In one embodiment, the finger may include a flexible backbone, a plurality of jamming layers, a cable, and a membrane bag. The backbone may have a first end, a second end positioned opposite the first end, a first side, a second side positioned opposite the first side, a third side, and a fourth side positioned opposite the third side. The backbone may include a flexible beam extending along the third side of the backbone in a direction from the first end toward the second end of the backbone, and a plurality of branches attached to the flexible beam and spaced apart from one another. Each branch may include a first end surface extending along the first side of the backbone, a second end surface extending along the second side of the backbone, and a side surface extending along the fourth side of the backbone. The jamming layers may be positioned along the fourth side of the backbone and may extend over the side surfaces of the branches. The cable may extend through each of the branches. The membrane bag may be positioned over the backbone and the jamming layers.

In some embodiments, the first end surfaces of the branches may collectively extend along a majority of the first side of the backbone, and the second end surfaces of the branches may collectively extend along a majority of the second side of the backbone. In some embodiments, the first end surfaces and the second end surfaces of the branches each may define an end profile having one or more curved edges. In some embodiments, the first end surfaces and the second end surfaces of the branches each may define an end profile having a semi-elliptical shape. In some embodiments, the flexible beam and the branches may be integrally formed with one another. In some embodiments, the backbone also may include a plurality of tabs attached to the branches and extending along the fourth side of the backbone. In some embodiments, each tab may be attached to the side surface of one of the branches and may overlap a first portion of the side surface of an adjacent one of the branches when the backbone is in a linear configuration. In some embodiments, each tab may overlap a second portion of the side surface of the adjacent one of the branches when the backbone is in a curved configuration, with the second portion being greater than the first portion. In some embodiments, the flexible beam, the branches, and the tabs may be integrally formed with one another. In some embodiments, the cable may be positioned closer to the fourth side than the third side of the backbone.

In yet another aspect, a finger for a robotic gripper is provided. In one embodiment, the finger may include a flexible backbone, a plurality of jamming layers, a cable, a membrane bag, a servo motor, and a servo holder. The backbone may have a first end and a second end positioned opposite the first end. The backbone may include a flexible beam extending in a direction from the first end toward the second end of the backbone, and a plurality of branches attached to the flexible beam and spaced apart from one another. The jamming layers may be positioned along the backbone and may extend over respective surfaces of the branches. The cable may extend through each of the branches. The membrane bag may be positioned over the backbone and the jamming layers. The servo motor may be coupled to the cable. The servo holder may be positioned over the servo motor. The membrane bag and the servo holder may be coupled to one another to define an interior region therebetween for applying negative pressure.

In some embodiments, the membrane bag may be flexible, and the servo holder may be rigid. In some embodiments, the membrane bag and the servo holder may be coupled to one another by one or more fixtures and one or more fasteners. In some embodiments, the membrane bag may include a tubular portion having a closed end and an open end positioned opposite the closed end, and a flange portion positioned at the open end of the tubular portion. In some embodiments, the tubular portion may be positioned over the backbone and the jamming layers, and the flange portion may be positioned between the one or more fixtures and the servo holder. In some embodiments, the membrane bag and the servo holder may be coupled to one another by a plurality of fixtures, and the fixtures may be coupled to one another by a plurality of fasteners. In some embodiments, the servo motor may be coupled to the cable by a servo horn configured to rotate upon activation of the servo motor.

These and other aspects and improvements of the present disclosure will become apparent to one of ordinary skill in the art upon review of the following detailed description when taken in conjunction with the several drawings and the appended claims.

BRIEF DESCRIPTION OF THE DRAWINGS

FIG. 1B is a perspective view of a finger of the gripper of FIG. 1A.

FIG. 1C is an exploded perspective view of the finger of the gripper of FIG. 1A, showing a backbone, jamming layers, a membrane bag, a servo motor, a servo holder, fixtures, and fasteners of the finger.

FIG. 8A is a plan view of a finger for a gripper in accordance with one or more embodiments of the disclosure, as may be used with the gripper FIG. 1A, showing a backbone, a plurality of jamming layers, a pair of membrane bags, and a plurality of tubes of the finger.

FIG. 8B is a plan view of the backbone of the finger of FIG. 8B.

Figure 1A:
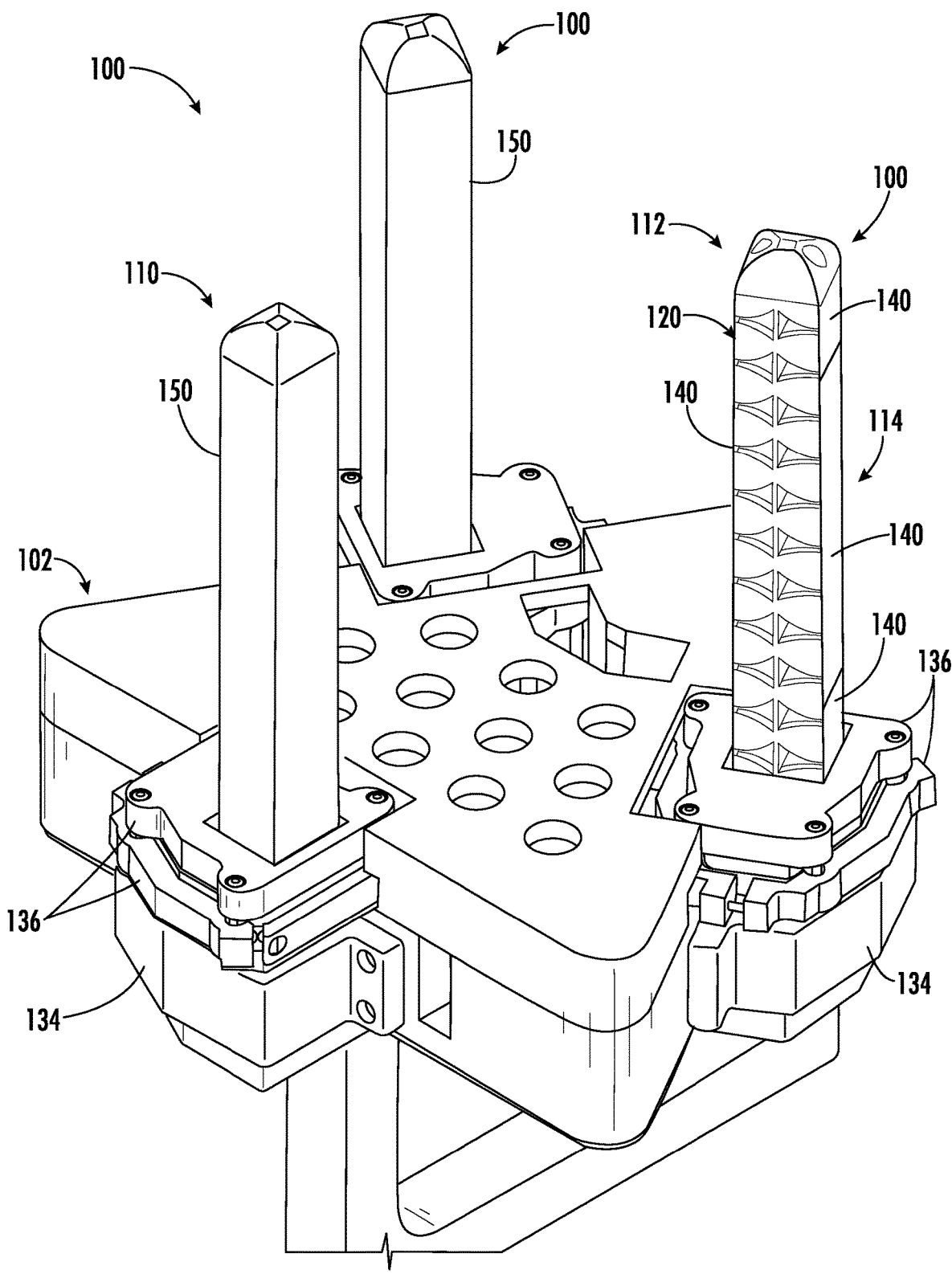
FIG. 1A is a perspective view of a variable stiffness robotic gripper in accordance with one or more embodiments of the disclosure, showing a palm and fingers of the gripper.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF THE DISCLOSURE

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. In some instances, well known methods, procedures, components, and circuits have not been described in detail so as not to unnecessarily obscure aspects of the embodiments.

Overview

The present disclosure provides embodiments of a variable stiffness compliant finger or actuator designed by integrating a layer jamming technique into a compliant skeleton that can achieve one-way or two-way bending motion. The layer jamming technique may be utilized by attaching multiple interlocked-configured jamming layers, such as sheets of film, along one or both of a pair of opposite side faces of the backbone. In some embodiments, the backbone and the jamming layers may be sealed together in a membrane bag, such as a latex airtight bag. In other embodiments, the jamming layers may be separately sealed together in a membrane bag, and the combination of the jamming layers and the membrane bag may be coupled to the backbone. A compliant robotic gripper may be formed by adopting three triangularly distributed actuators as fingers of the gripper. Initially, to ensure a rapid and adaptive gripping and safety of humans, the gripper may be in a flexible mode, and the three fingers may be bent to conform to a shape of the grasped object. In some embodiments, the skeletons of the fingers may be cable-driven, such that cables are used to bend the fingers. In other embodiments, the skeletons of the fingers may be pneumatically-driven, such that negative pressure and/or positive pressure may be applied to channels within the backbone to cause the fingers to bend. At a second stage of grasping, negative pressure may be applied to the membrane bags of the fingers such that the jamming layers are pressed. The pressure between the jamming layers may produce a force of static friction that impedes the relative movement of layers and holds the fingers and the overall gripper in a current position, which results in increases in both stiffness and load capacity.

In some embodiments, a compliant robotic gripper is provided with three variable stiffness fingers. In some embodiments, the shape morphing of the fingers may be cable-driven, and the stiffness variation may be enabled by layer jamming. In other embodiments, the shape morphing of the fingers may be pneumatically-driven, and the stiffness variation may be enabled by layer jamming. The inherent flexibility may make the compliant gripper suitable for tasks such as grasping soft and irregular objects. As discussed above, existing compliant grippers generally have a relatively low load capacity due to low structural stiffness, which limits their applications. The variable stiffness robotic grippers described herein have the potential to address this challenge because their stiffness can be tuned on demand based on the needs of particular tasks. In some embodiments, the compliant backbone of each finger may be made of 3D printed PLA materials. In some embodiments, the backbone may be sandwiched with multiple jamming layers provided as thin films of material on opposite sides of the backbone. In other embodiments, jamming layers may be provides along only one side of the backbone.

The working process of the robotic gripper may follow two basic steps. First, the compliant skeleton may be bent to a desired shape. In some embodiments, such bending may be achieved by actuating a tension cable via a servo motor. In other embodiments, bending may be achieved by applying a negative pressure and/or a positive pressure, for example by a vacuum pump, to one or more channels within the backbone. Second, upon application of a negative pressure, for example by a vacuum pump, to the membrane bags of the fingers, the fingers may be stiffened up due to the increasing of friction between contact surfaces of the jamming layers which prevents their relative movement. As a result, the load capacity of the fingers, and the overall gripper, will be increased proportionally. As described below, prototype fingers and grippers were prepared, and tests for stiffness of an individual finger and load capacity of the overall robotic gripper were conducted to validate the capability of the design. The results showed a 180-fold increase in stiffness of the individual finger and a 30-fold increase in the gripper's load capacity.

Illustrative Compliant Robotic Gripper

Referring now to FIG. 1A, a compliant robotic gripper 100 in accordance with one or more embodiments of the disclosure is depicted. Various subassemblies and components of the gripper 100 are shown in FIGS. 1B-1I. As described below, the gripper 100 may be used for grasping and manipulating objects. As shown in FIG. 1A, the gripper 100 may include three fingers 110 which are assembled to a 3D printed palm 102. Each finger 110 may include two main parts: a compliant skeleton 112 and a layer jamming module 114, as described herein.

Illustrative Compliant Backbone

Figure 1D:
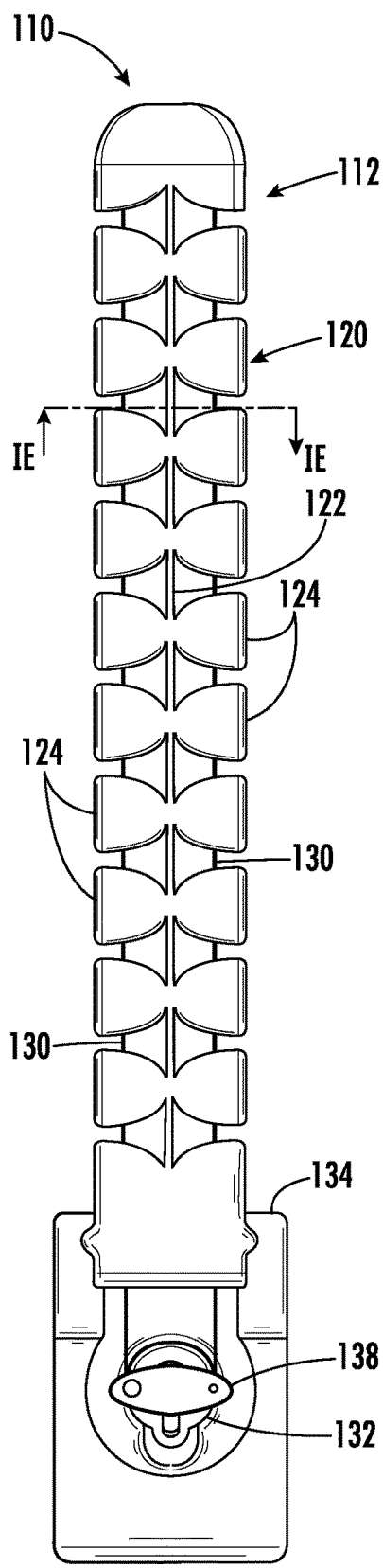
FIG. 1D is a plan view of a portion of the finger of the gripper of FIG. 1A, showing the backbone, the servo motor, the servo holder, and cables of the finger.
Figure 1E:
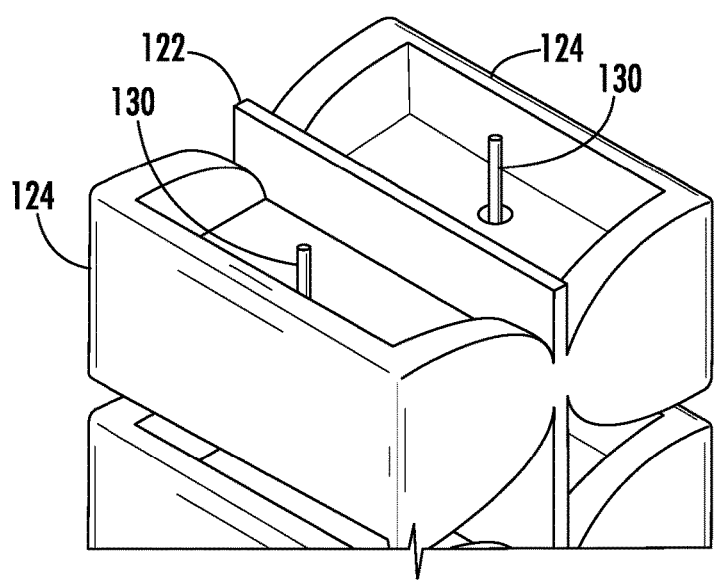
FIG. 1E is a cross-sectional perspective view of a portion of the finger of the gripper of FIG. 1A, showing the backbone and the cables.
Figure 1F:
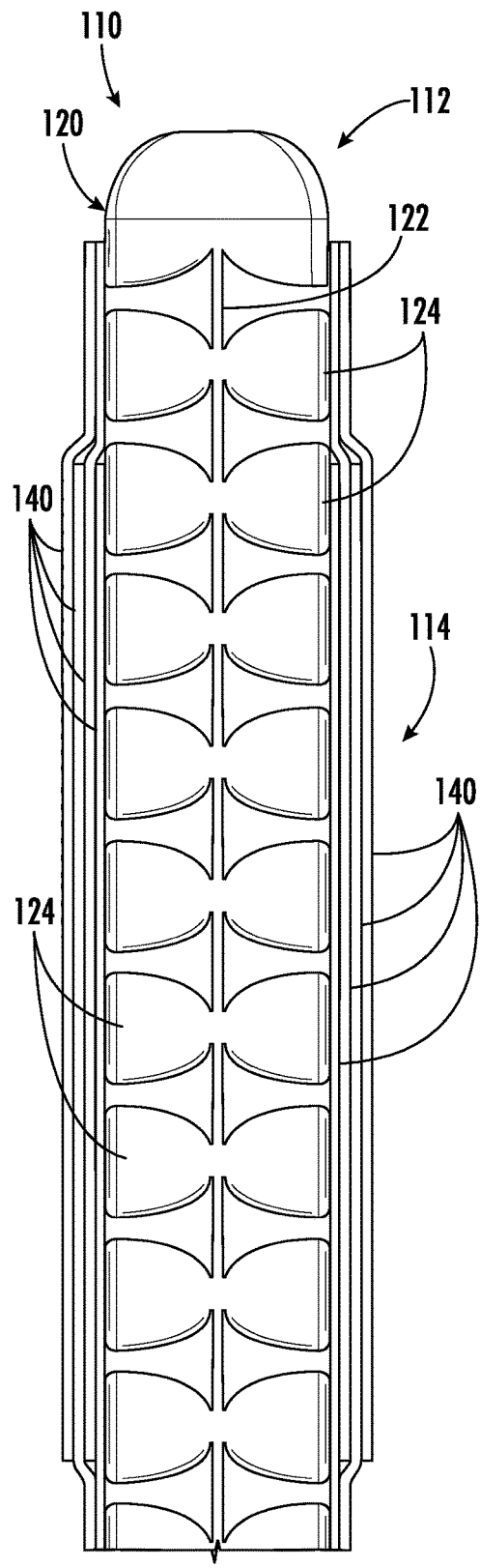
FIG. 1F is a plan view of a portion of the finger of the gripper of FIG. 1A, showing the backbone and the jamming layers.
Figure 1G:
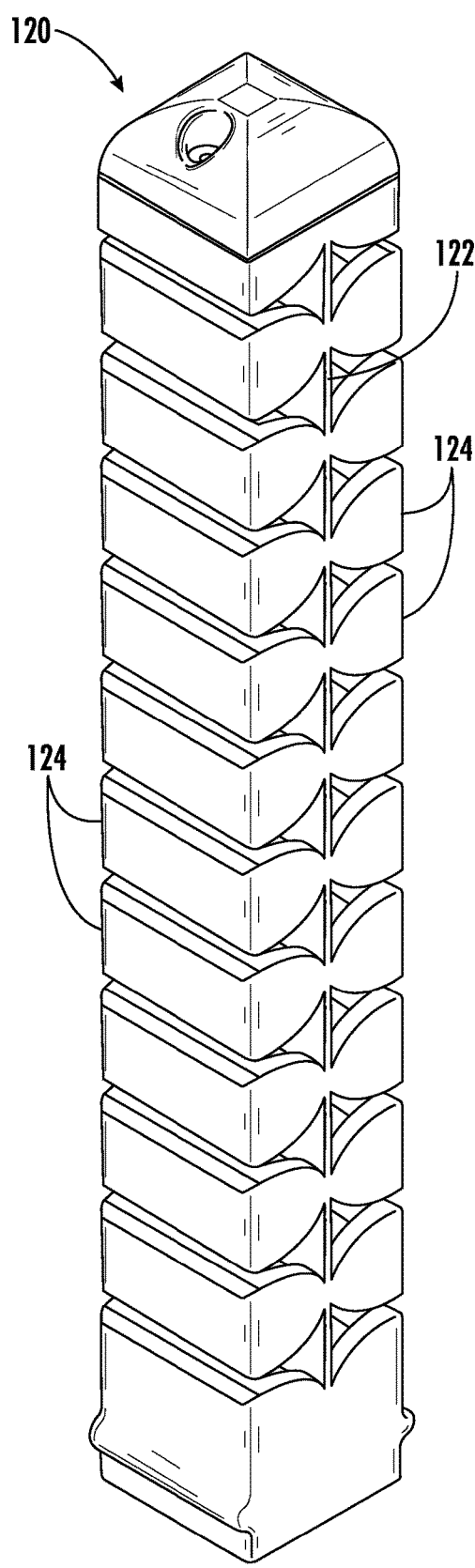
FIG. 1G is a perspective view of a portion of the finger of the gripper of FIG. 1A, showing the backbone.
Figure 1H:
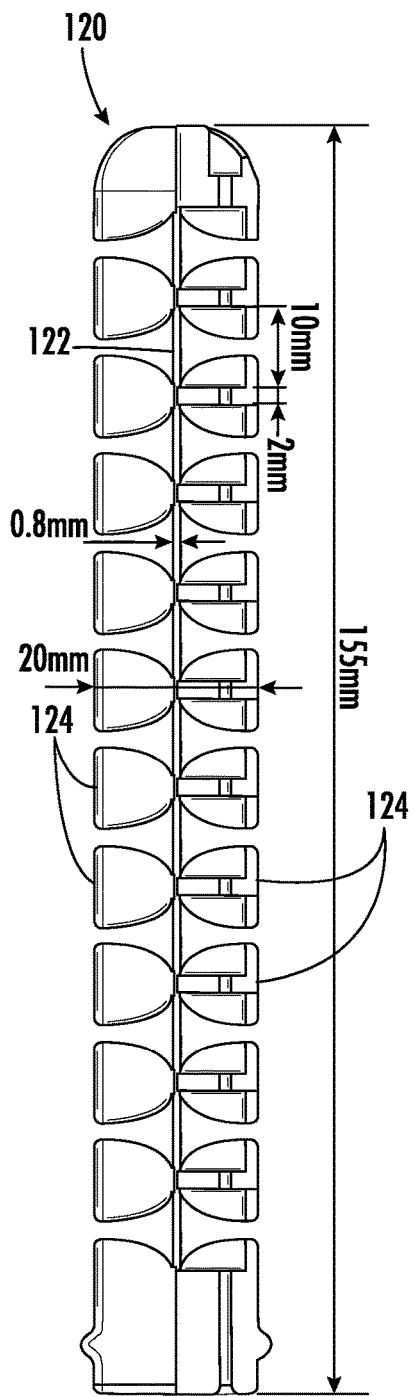
FIG. 1H is a partial cross-sectional plan view of a portion of the finger of the gripper of FIG. 1A, showing the backbone in a linear configuration, with the right half of the backbone shown in cross-section.
Figure 1I:
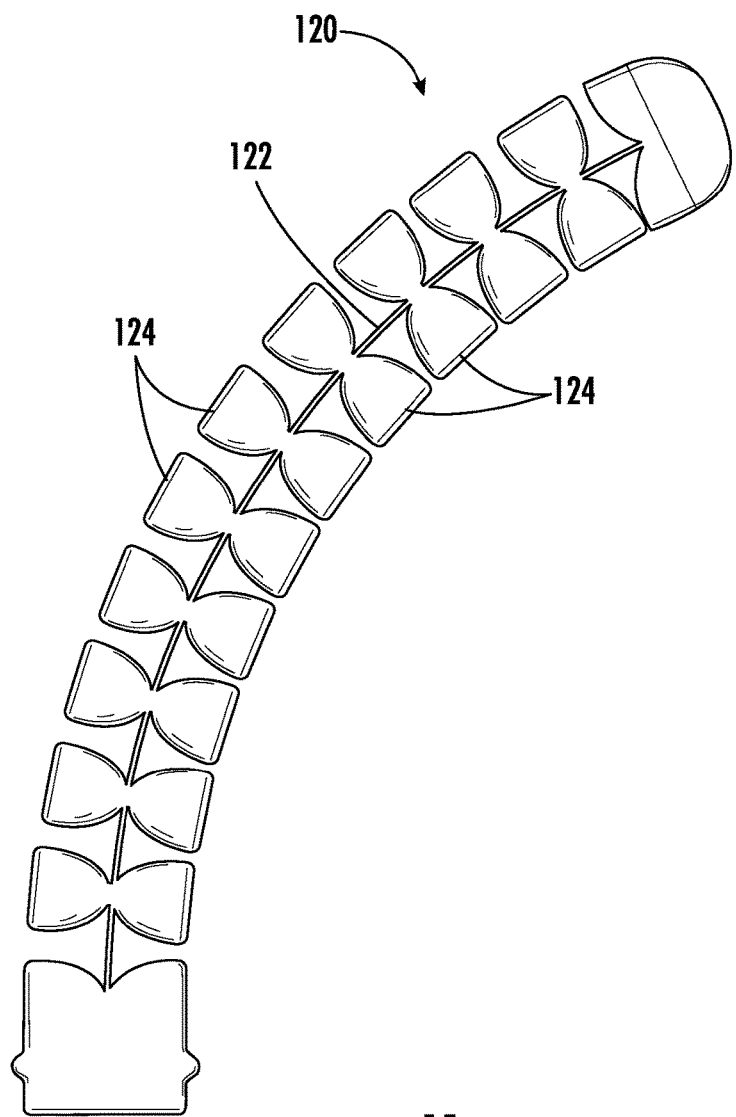
FIG. 1I is a plan view of a portion of the finger of the gripper of FIG. 1A, showing the backbone in a curved configuration.

The skeleton 112 of the variable stiffness finger 110 may include an elongated compliant backbone 120, two cables 130, a servo motor 132, an airtight servo holder 134, and several fixtures 136. FIGS. 1G-1I show a shape and example dimensions of the backbone 120 in accordance with certain embodiments, although other shapes, dimensions, and dimensional relationships may be used in other embodiments. As shown, a consecutive thin flexible beam 122 may be positioned in the middle of the backbone 120. In some embodiments, the beam 122 may be 0.8 mm in thickness and designed to guarantee the flexibility of backbone 120, although other thicknesses of the beam 122 may be used. Along the beam 122, a plurality of branches 124 may be evenly distributed on each side in longitudinal direction. Although ten (10) branches 124 are shown in each side in the illustrated embodiment, more or less branches 124 may be used in other embodiments. As shown, a plurality of jamming layers 140 may be placed on outer side surfaces of the branches 124. Although four (4) interlocked jamming layers 140 are shown positioned along each of two opposite sides of the backbone 120 in the illustrated embodiment, more or less jamming layers 140 may be used in different arrangements in other embodiments. In a jammed state, the force of static friction between the jamming layers 140 generates a moment to counter the moment introduced by external force, which increases the bending stiffness of the backbone 120. The maximum moment produced by the jamming effect is determined by the maximum force of friction and the lever arm. Compared with a design in which the jamming layers 140 are set near the center, the branches 124 of the backbone 120 can significantly lengthen the lever arm so that the layers 140 can produce a much larger moment. The end surfaces of each branch 124 are configured for supporting a membrane bag 150, which may be formed of soft latex, and reducing incidence of trapping of the bag 150 between the branches 124 when the membrane bag 150 is under vacuum.

In some embodiments, as shown, the finger 110 may include the flexible backbone 120, a plurality of the jamming layers 140, a pair of the cables 130, and the membrane bag 150. The backbone 120 may have a first end, a second end positioned opposite the first end, a first side, a second side positioned opposite the first side, a third side, and a fourth side positioned opposite the third side. The backbone 120 may include the flexible beam 122 extending in a direction from the first end toward the second end of the backbone 120, and a plurality of the branches 124 attached to the flexible beam 122 and spaced apart from one another. Each branch 124 may include a first end surface extending along the first side of the backbone 120, a second end surface extending along the second side of the backbone 120, and a side surface extending along the third side or the fourth side of the backbone 120. The first end surfaces of the branches 124 may collectively extend along a majority of the first side of the backbone 120, and the second end surfaces of the branches 124 may collectively extend along a majority of the second side of the backbone 120. The jamming layers 140 may be positioned along the third side and/or the fourth side of the backbone 120 and may extend over respective side surfaces of the branches 124. The cables 130 may extend through each of the branches 124. The membrane bag 150 may be positioned over the backbone 120 and the jamming layers 140.

In some embodiments, the first end surfaces and the second end surfaces of the branches 124 each may define an end profile having one or more curved edges. In some embodiments, the first end surfaces and the second end surfaces of the branches 124 each may define an end profile having a semi-elliptical shape. In some embodiments, the first end surfaces of the branches 124 may collectively extend along at least 70% of the first side of the backbone 120, and the second end surfaces of the branches 124 may collectively extend along at least 70% of the second side of the backbone 120. In some embodiments, the flexible beam 122 and the branches 124 may be integrally formed with one another. In some embodiments, the flexible beam 122 may be centrally positioned between the third side and the fourth side of the backbone 120. In some embodiments, the plurality of branches 124 may include a first set of branches 124 each extending from the flexible beam 122 to the third side of the backbone 120, and a second set of branches 124 each extending from the flexible beam 122 to the fourth side of the backbone 120. In some embodiments, the flexible beam 122 may be offset toward the third side or the fourth side of the backbone 120.

In some embodiments, as shown, the finger 100 may include the flexible backbone 120, a plurality of the jamming layers 140, a pair of the cables, the membrane bag 150, the servo motor 132, and the servo holder 134. The backbone 120 may have a first end and a second end positioned opposite the first end. The backbone 120 may include the flexible beam 122 extending in a direction from the first end toward the second end of the backbone 120, and a plurality of the branches 124 attached to the flexible beam 122 and spaced apart from one another. The jamming layers 140 may be positioned along the backbone 120 and may extend over respective surfaces of the branches 124. The cables 130 may extend through each of the branches 124. The membrane bag 150 may be positioned over the backbone 120 and the jamming layers 140. The servo motor 132 may be coupled to the cables 130. The servo holder 134 may be positioned over the servo motor 132. The membrane bag 150 and the servo holder 134 may be coupled to one another to define an interior region therebetween for applying negative pressure.

In some embodiments, the membrane bag 150 may be flexible, and the servo holder 134 may be rigid. In some embodiments, the membrane bag 150 and the servo holder 134 may be coupled to one another by one or more of the fixtures 136 and one or more fasteners. In some embodiments, the membrane bag 150 may include a tubular portion having a closed end and an open end positioned opposite the closed end, and a flange portion positioned at the open end of the tubular portion. In some embodiments, the tubular portion may be positioned over the backbone 120 and the jamming layers 140, and the flange portion may be positioned between the one or more fixtures 136 and the servo holder 134. In some embodiments, the membrane bag 150 and the servo holder 134 may be coupled to one another by a plurality of the fixtures 136, and the fixtures 136 may be coupled to one another by a plurality of the fasteners. In some embodiments, the servo motor 132 may be coupled to the cables 130 by the servo horn 138 configured to rotate upon activation of the servo motor 132.

Morphing Actuation Method

Various actuation methods have been used for compliant actuators, with two widely adopted methods being variable length tendons (in the form of tension cables or shape memory alloy) and pneumatic actuation. The basic operating principle behind shape memory alloy (SMA) technology is that nickel titanium (NiTi) wire contracts under joule heating that is typically produced by passing electrical currents through the wire, which is non-instantaneous and thus inapplicable for a gripper. Pneumatic actuation, which has been used to inflate chambers in a soft mechanism for achieving desired deformation, generally requires several tubes and valves to work and thus may not be suitable in some applications due to size constraints. In contrast to such techniques, a gripper may use tension cables driven by servo motors, which provide advantages of high accessibility, low volume requirement, and fast response in control.

According to embodiments of the finger 110 described herein, the tension cables actuation approach for the skeleton 112 may be implemented by a servo motor 132 and two cables 130. As shown in FIGS. 1D and 1E, two driven cables 130 may extend through the skeleton 112 in the longitudinal direction via small holes formed in the branches 124, with one end of each cable 130 fixed to the top portion of the backbone 120 and the other end of each cable 130 fixed to a servo horn 138. As shown, the bottom ends of the two cables 130 may be attached at opposite positions of the horn 138, and the cables 130 may be straight initially when the backbone 120 is in a linear configuration. For the illustrated embodiment, the two cables 130 respectively work on either the forth stroke or the back stroke, which accelerates the back stroke of the actuator and helps the finger 120 recover after manipulation.

Variable Stiffness via Layer Jamming

With respect to layer jamming technique, interlocked and partially overlapping layers are two widely used configurations for sheets of material. An interlocked setup generally may provide a higher stiffness ratio. See Wall, V. et al. As shown in FIG. 1F, the jamming layers 140 of the gripper 100 may be arranged in an interlocked configuration. In some embodiments, as shown, four (4) interlocked films, including two (2) upper layers and two (2) lower layers, may be attached to each side of the backbone 120 by gluing one end to either the top end portion or the bottom end portion of the backbone 120. To implement the layer jamming effect, the membrane bag 150 that may be made of a soft latex membrane, an airtight vessel such as the servo holder 134, several fixtures 136, and several fasteners may be employed to create a hermetic seal, as shown in FIGS. 1B and 1C.

Depending on whether the layer jamming effect is activated, the finger 110 has two modes: a flexible mode and a locked mode. In the flexible mode, there is no negative pressure supplied to the finger 110, and thus the backbone 120 can bend and recover easily under actuation of the servo motor 132 with small resistance. The jamming layers 140 on both sides of the backbone 120 can conform to the shape of the morphed backbone 120 and remain in contact with the side surfaces of the branches 124. In the first phase of a gripper working period, the fingers 110 may be in the flexible mode and driven to bend, and a grasp for an object formed by at least three contact points may be established. Then, a certain negative pressure may be applied inside the membrane bag 150 through a pipe, and the fingers 110 may be transformed to the locked mode. In the locked mode, the pressure on the layer-layer, backbone-layer, and bag-layer surfaces increases and hardens the finger 110. When the object is pulled apart from the gripper 100 by an external force, the static frictional force on the layer-layer, backbone-layer, and bag-layer surfaces can generate an antagonistic moment to offset the moment from external force so as to hold the morphed shape of the gripper 100 and keep a stable grasp of the object.

Example Fabrication of Compliant Robotic Gripper

Figure 1J:
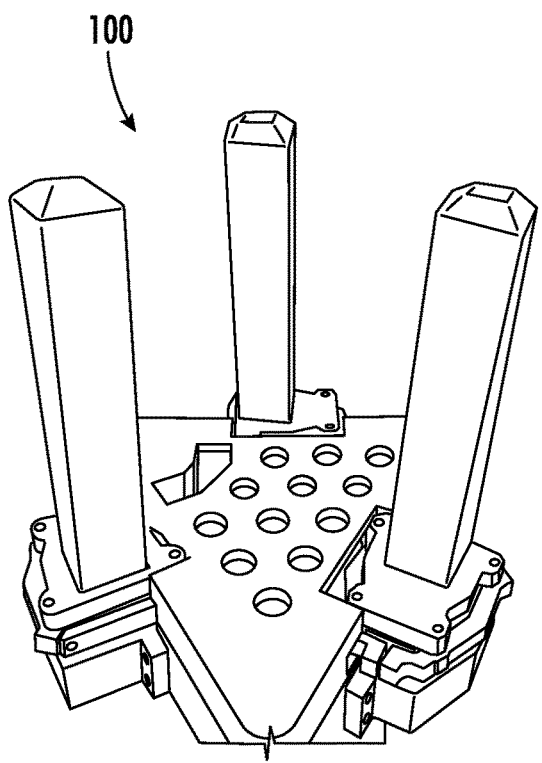
FIG. 1J is a perspective view of the gripper of FIG. 1A.
Figure 1K:
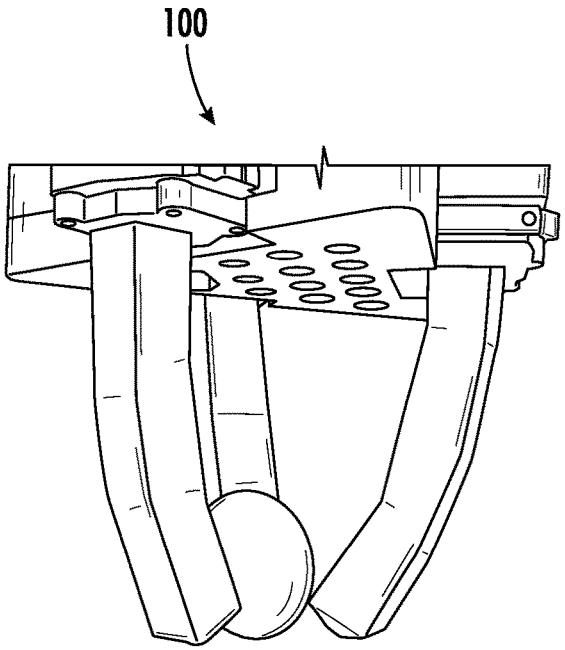
FIG. 1K is a perspective view of the gripper of FIG. 1A, showing the fingers grasping an egg.
Figure 1L:
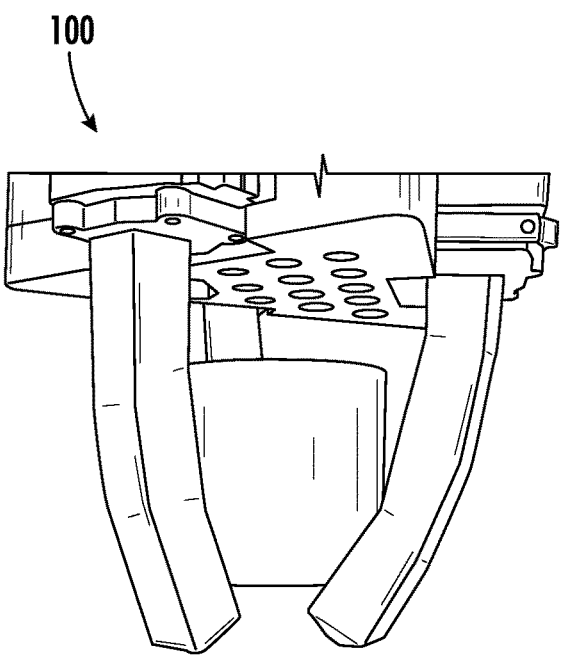
FIG. 1L is a perspective view of the gripper of FIG. 1A, showing the fingers grasping a cylindrical column.
Figure 1M:
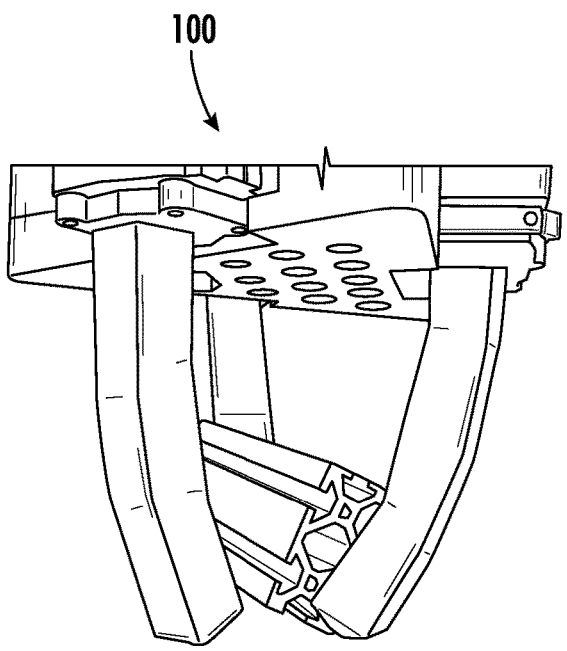
FIG. 1M is a perspective view of the gripper of FIG. 1A, showing the fingers grasping an irregular-shaped profile.

An example prototype of the compliant robotic gripper 100 was fabricated and tested as described below. The backbones 120 and the fixtures 136 of the compliant fingers 110 were made of polylactic acid (PLA) filament and 3D printed with 0.2 mm in layer thickness and 40% in infill density in a MakerBot Z18 printer. For the servo holder 134, 100% infill density and a higher printing temperature were used to provide the necessary airtightness. The skeleton 112 of the actuator was driven by a Hitec HS-65HB+ servo motor installed in the servo holder 134. Fishing line, having an average diameter of 0.7 mm, was adopted as the driven cables 130. The two ends of the fishing line were fixed to either the skeleton 112 or the servo arm 138 using an electric soldering iron. The jamming layers 140 were made of Dura-Lar film with thickness of 0.127 mm and cut into rectangles each 18 mm in width and 110 mm in length using a laser cutter. Four (4) layers 140 were glued to each side of the backbone 120 in an interlocked configuration. The membrane bag 150 was fabricated by cropping and gluing a latex membrane with thickness of 0.203 mm into a cuboid shape with one open end. Then, the skeleton 112 was fixed in the airtight holder 134 by friction between contact surfaces, with the membrane bag 150 wrapping the backbone 120 and the top of the holder 134. The fixtures 136 were used to establish a hermetically sealed seam between the membrane bag 150 and the holder 134 and secured with fasteners. This method advantageously allows the servo motor 132 to move freely inside the sealed interior region formed by the membrane bag 150 and the servo holder, without the need of considering the sealing of the servo connection part, and thus provides convenience for future maintenance. An air tube was glued to the surface of the servo holder at one end and connected to a vacuum pump at the other end. All three fingers 110 were secured to a 3D printed gripper palm 102. A vacuum pump was fixed at the palm of the gripper 100 to generate the negative pressure applied to the interior region defined by the membrane bag 150 and the servo holder 134. The prototype of the gripper 100 is depicted in FIG. 1J. Use of the prototype gripper 100 to grasp example fragile and irregular-shaped objects is shown in FIGS. 1K-1M, illustrating gripping of an egg, a cylindrical column, and an irregular-shaped profile.

Force Control and Displacement Control Models

In order to control the fingers 110 of the gripper 100, a basic model of a single backbone 120 without jamming layers 140 was derived based on the Pseudo Rigid Body Model (PBRM) method. More specifically, two kinds of analytical open loop control models were derived: a force control model and a displacement control model. The former requires the derivation of the relationship of the actuation force F with the bending angle $\theta$ of the deflected finger beam, while the latter seeks the relationship of the actuation displacement $\Delta L$ with the bending angle $\theta$. The derivation is described as follows.

Pseudo-Rigid-Body Model

Figure 2A:
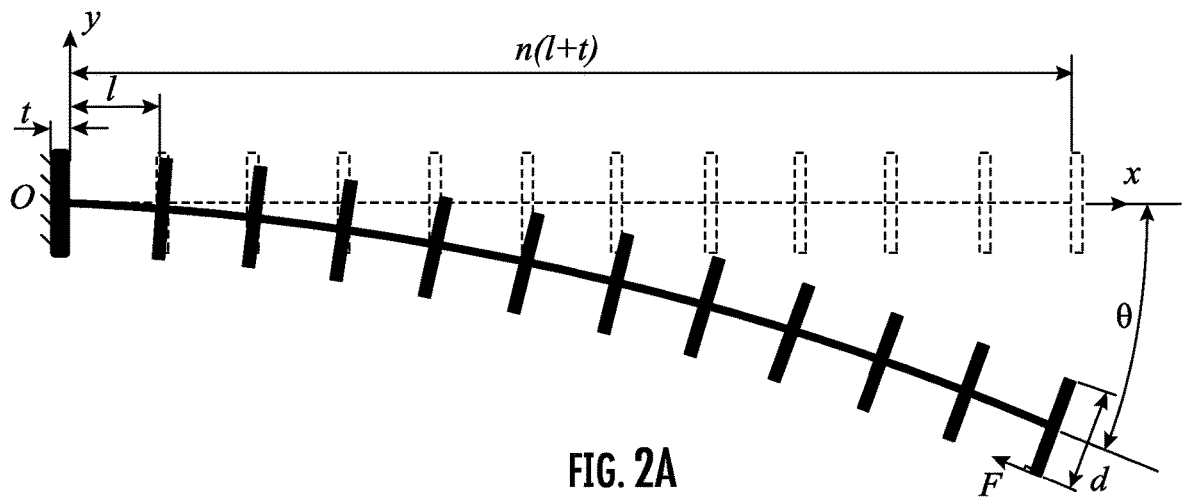
FIG. 2A is a schematic diagram of the backbone of the finger of the gripper of FIG. 1A.
Figure 2B:
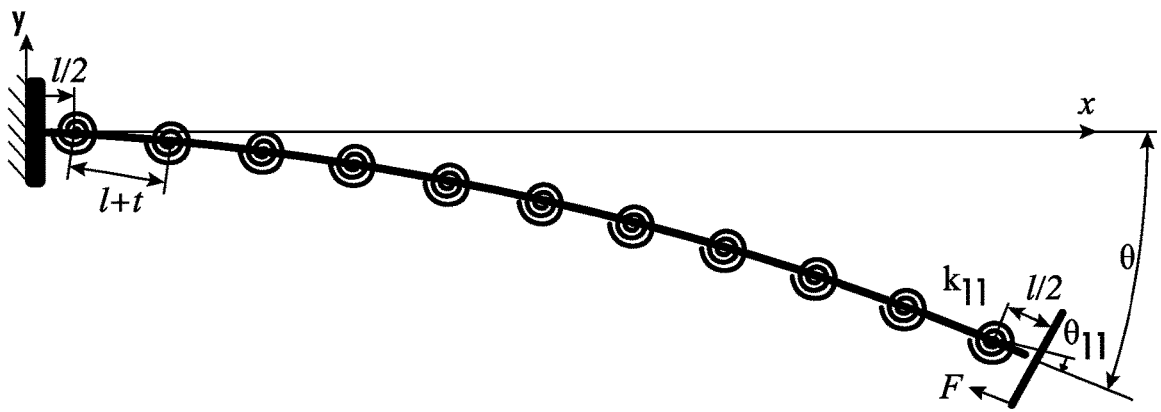
FIG. 2B is a pseudo-rigid-body model of the backbone of the finger of the gripper of FIG. 1A.

The finger backbone can be modeled as a sequence of n compliant segments (length l and thickness a) separated by relatively rigid spacers (thickness t) as shown in FIG. 2A. L is the undeflected length of the flexible beam, and d is the distance between two driven cables, respectively. When the actuation cable is pulled by the servo motor, a force F is applied to the last spacer in the direction perpendicular to the spacer, and the compliant backbone is bent to angle θ. The Pseudo-Rigid-Body (PRB) model of this backbone is shown in FIG. 2B, in which the compliant flexural segments are simplified as torsion springs at the middle points of the flexural segments.

Calculation of the Bending Angle

Figure 3A:
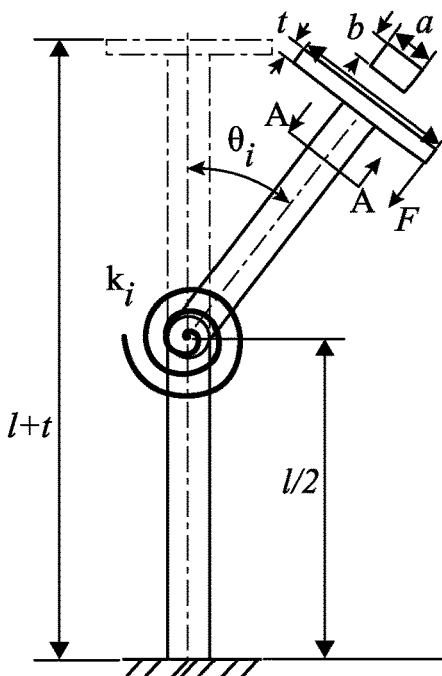
FIG. 3A is a schematic diagram of a segment of the backbone of the finger of the gripper of FIG. 1A.

To determine the actuation force and stiffness of the compliant finger, the PRB model of a single segment, as shown in FIG. 3A, can be studied. The spring constant in the PRB model is $$k_i = \frac{EI}{l} = \frac{Ea^3b}{12l}, i=1, \ldots, n \quad (1)$$

where E is Young's modulus of beam material and the cross-section of the flexural beam is assumed to be an a (in-plane thickness) by b (out-of-plane thickness) rectangle. Since the bending angle of each segment is relatively small and the tension force in the cable is constant along its length, it can be assumed that each torsion spring is subject to same bending moment M=Fd/2, which produces a bending angle $$\theta_i = \frac{M}{k_i} = \frac{6Fdl}{Ea^3b}, i=1, \ldots, n \quad (2)$$

As a result, the total bending angle is calculated as $$\theta = \sum_{i=1}^{n} \theta_i = \frac{6nFdl}{Ea^3b}, i=1, \ldots, n \quad (3)$$

This provides a linear relationship of the bending angle θ with the cable force F. Because the in-plane thickness of the rigid spacer (20 mm) is much larger than that of the compliant segment, the deformation of rigid spacers is trivial and not taken into consideration.

Calculation of the Variation of Cable Length

If applying kinematic control to the compliant finger, the relationship of the extension of the actuation cable ΔL with respect to the corresponding bending angle θ may be derived. For convenience, the radius of curvature of each compliant segment may be defined by $$R_i = \frac{l}{\theta_i} = \frac{nl}{\theta}, i=1, \ldots, n \quad (4)$$

Figure 3B:
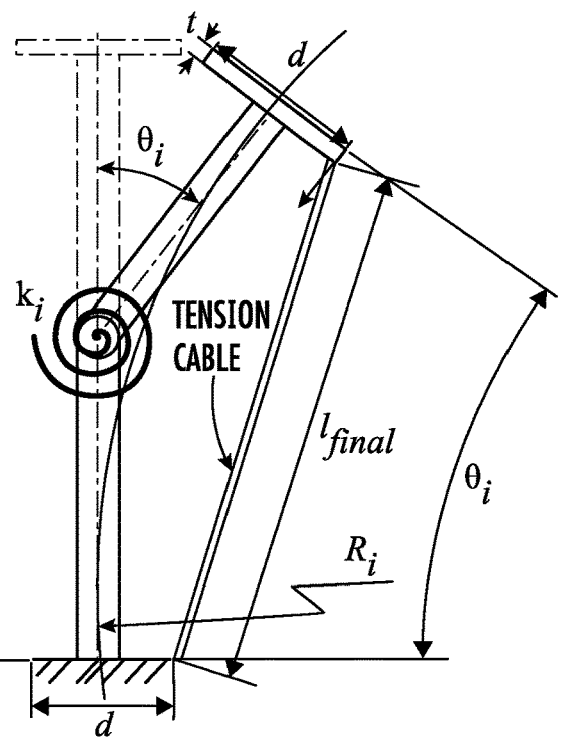
FIG. 3B is a pseudo-rigid-body model of a segment of the backbone of the finger of the gripper of FIG. 1A.

By FIG. 3B, the cable length for one segment after bending can be determined as $$l_{final} = 2\left(R_i - \frac{d}{2}\right)\sin\left(\frac{\theta_i}{2}\right), i=1, \ldots, n \quad (5)$$

The shortening of the actuation cable for one segment can be calculated as $$\Delta L_i = l - l_{final}, i=1, \ldots, n \quad (6)$$

The total variation of the actuation cable is $$\Delta L = \sum_{i=1}^{n} \Delta L_i = n(l - l_{final}), i=1, \ldots, n. \quad (7)$$

To obtain the relationship of the extension of the actuation cable ΔL and the total bending angle θ, substituting Equations (4) and (5) into Equation (7) yields $$\Delta L = n\left[l - 2\left(\frac{nl}{\theta} - \frac{d}{2}\right)\sin\left(\frac{\theta}{2n}\right)\right] \quad (8)$$

Calculation of the Variation of Cable Length in Terms of Actuation Force

To relate the extension of the actuation cable ΔL to the actuation force F, we Equation (3) can be substituted into Equation (8) to obtain $$\Delta L = n\left[l - \left(\frac{Ea^3b}{3Fd} - d\right)\sin\left(\frac{3Fdl}{Ea^3b}\right)\right] \quad (9)$$

The values of all geometric parameters for the prototype are provided in Table 1. Because the fingers were 3D printed in polylactic acid (PLA) material, the Young's modulus of the prototype was unknown and needed to be measured. To do so, an experiment was designed and carried out to measure the relationship of the variation of cable length ΔL and the actuation force F.

Figure 4:
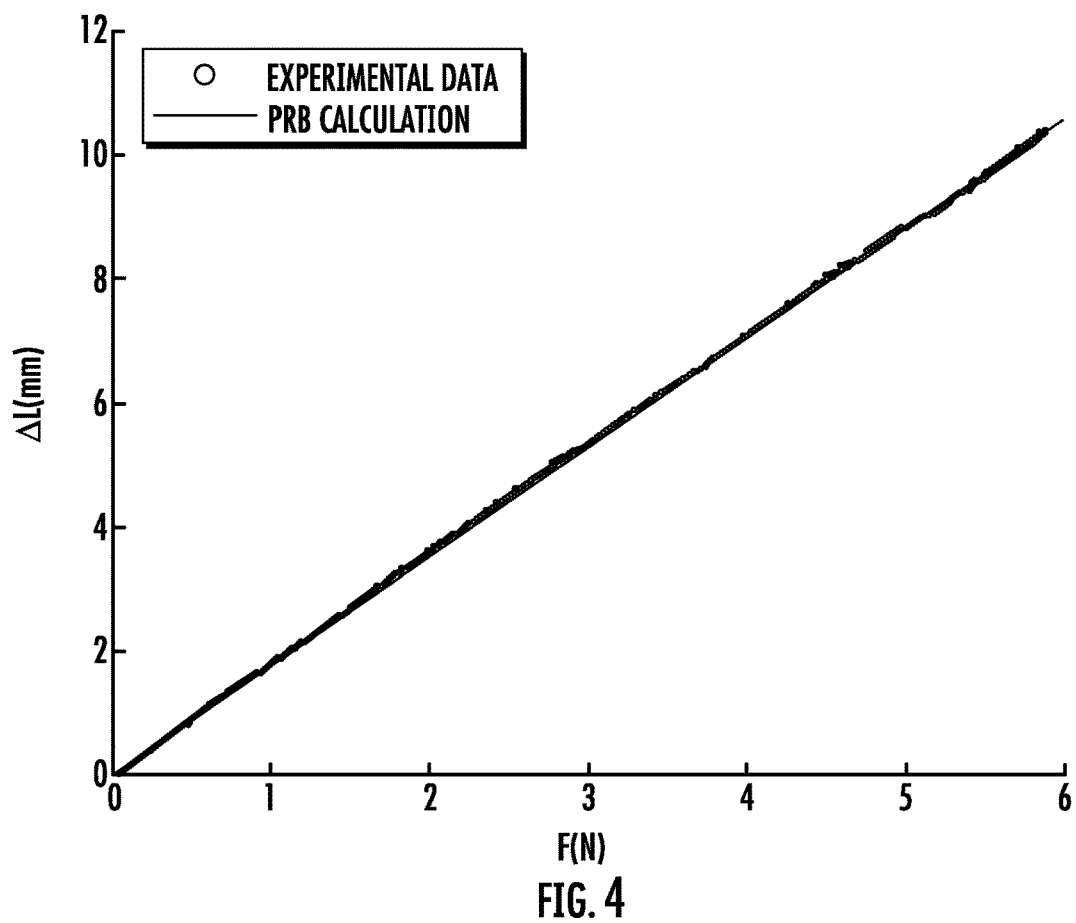
FIG. 4 is a graph illustrating variation of cable length as a function of actuation force for a finger of a gripper.

First, the root of the finger was clamped using a vise along the vertical direction. Second, the actuation cable was tied to the test head of a Mark-10 force sensor in the horizontal direction. The force sensor was mounted on a horizontal travel track with a displacement sensor recording the movement of force sensor. Third, the travel track was manually driven to pull the actuation cable, and the pulling force of actuation cable bends the finger. Fourth, readings from the force sensor and the displacement sensor were recorded. The experimental data is shown as the blue dots in FIG. 4. To find the Young's modulus of the 3D printed PLA material, Equation (9) was employed to fit the experimental data. The best fit returned a value of E=2:66 Gpa, which is a reasonable value according to properties of 3D printed PLA materials. The theoretical result derived from Equation (9) is plotted as the red curve shown in FIG. 4.

TABLE 1

| Parameters | Symbol | Value | Unit |
| --- | --- | --- | --- |
| number of segments | n | 11 | — |
| in-plane thickness of flexures | a | 0.8 | mm |
| out-of-plane thickness of flexures | b | 20 | mm |
| thickness of spacers | t | 2 | mm |
| length of flexures | l | 10 | mm |
| distance from cable to center beam | d | 12 | mm |
| fit Young's Modulus | E | 2.66 | Gpa |

Experimental Tests and Analysis of Results

Experiments were conducted on a single finger and the whole gripper, respectively, to test the performance and validate the hypothesis that layer jamming can significantly increase the stiffness of the compliant mechanism.

Single Finger Stiffness Test—Test Setup

Figure 5A:
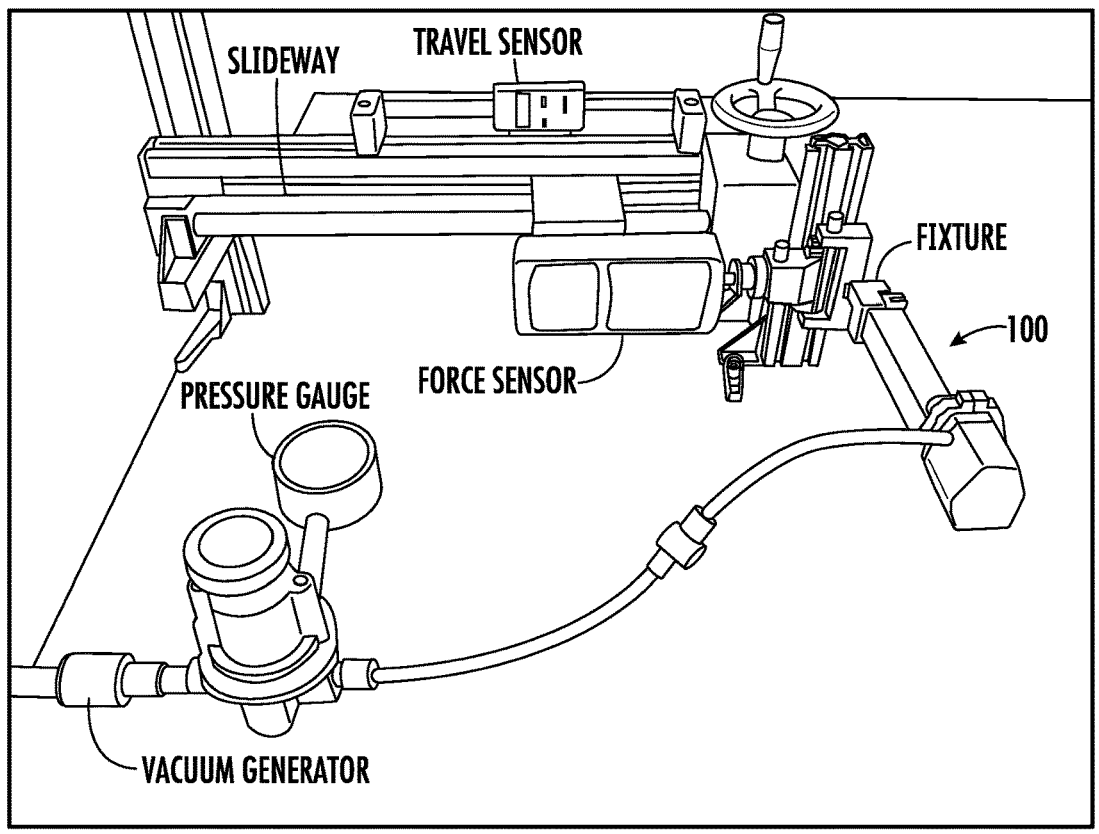
FIG. 5A is a perspective view of a test setup for determining stiffness of a finger of a gripper.

FIG. 5A shows the test setup used for the finger stiffness test. One finger was secured horizontally to eliminate the influence from gravity. A MARK-10 force sensor and a travel sensor were installed on a horizontal slideway with a crank handle at the end, which was used to drive the two sensors along the slideway. A fixture at the top of the finger included three 3D printed components, a shaft fixed to the end of the force sensor, a pair of shafts and bearings allowing frictionless longitudinal displacement, and a ball joint able to rotate freely. Such configuration ensures that the force applied to finger is exactly in the tracking direction of the force sensor and eliminates error from other trivial forces. A pipe connected to the finger was employed to vacuum the membrane bag. During the test, a set of different pressures were applied to the finger to induce the layer jamming effect. Then, the crank handle was turned manually to drive the sensor and push the finger. To obtain static data, force was recorded every 0.5 mm after a 10 second sample time over the total 10 mm of travel. Five repeated tests were conducted for each pressure, and the data was averaged for precision. The gradient of the Force-Displacement curve was defined as the stiffness of the finger.

Single Finger Stiffness Test—Analysis of Test Results

Figure 5B:
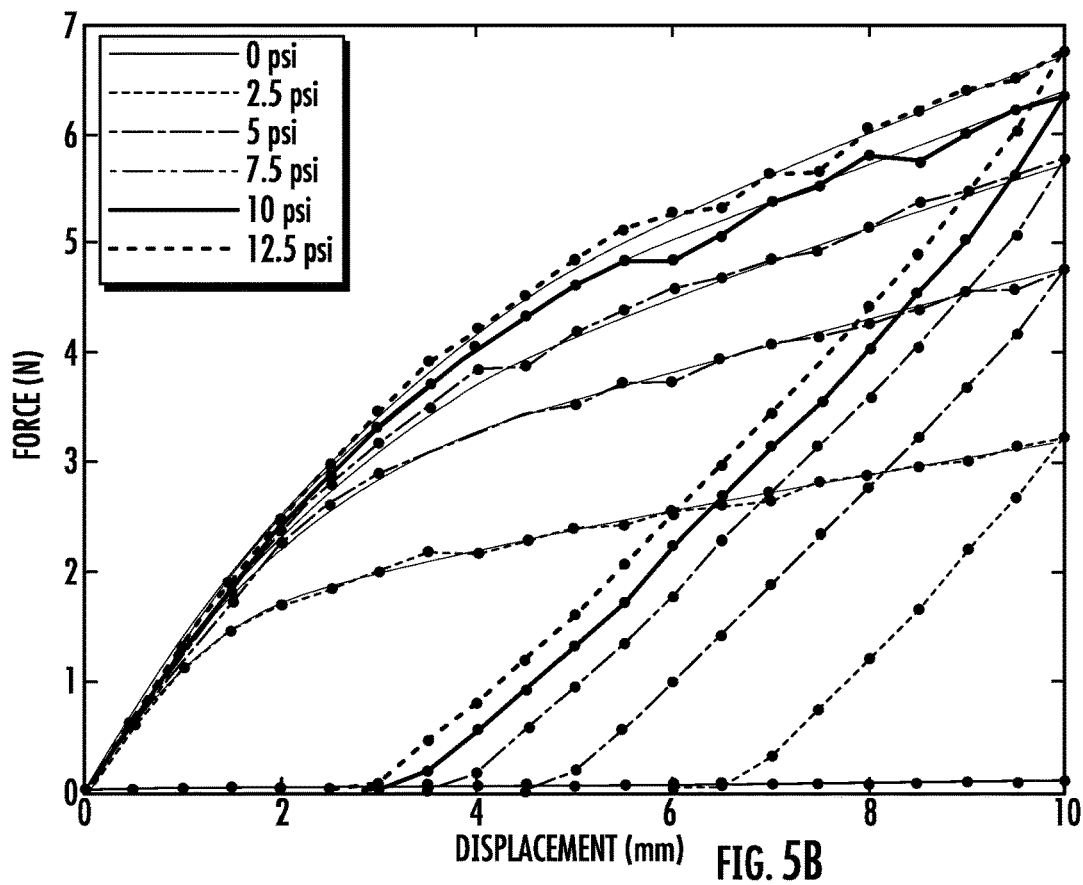
FIG. 5B is a graph illustrating force as a function of displacement for a finger of a gripper.

In the testing, six sets of data under pressures from the list {0, 2.5, 5, 7.5, 10, 12.5} psi were collected and plotted as separate points in FIG. 5B. For each non-zero pressure case, the Force-Displacement curve has three sections: a pre-slip section, a transition section, and a slip section. Within the pre-slip section, every group has a linear relationship between force and displacement because the force of friction between the jammed layers, which plays a most important role in the jamming effect, is lower than the maximum force of static friction. When the friction force reaches the maximum static friction force, the curve transforms to the transition region in which layers start to slip and the gradient of curve, the stiffness of the finger, starts to drop until all contact areas of the layers become slipped and the curve turns into the slip section. In the slip section, the slope of the curve maintains at a constant value while displacement keeps increasing. The force at the start point of the transition section has a positive correlation with given pressure, which agrees with the assumption that higher negative pressure increases maximum static frictional force between layers. The initial stiffness of the finger achieved a 180-fold increase from 0.008 N/mm under zero pressure to an average of 1.522 N/mm enhanced by layer jamming, which validates the availability and high efficiency of the layer jamming enabled variable stiffness method.

A Control Model for Finger Stiffness

A well-known model for fitting the transition region from static to kinetic friction is the Dahl model (see Dahl, P. R., A Solid Friction Model, *Tech. Rep.*, TOR-0158(3107-18)-1, Aerospace Corp., El Segundo, CA, May 1968), which is governed by the equation:

$$f(x)=\beta(1-e^{-\alpha x}) \quad (10)$$

where x is the relative displacement of two contact surfaces and f(x) is the frictional force between surfaces. Also, $\alpha>0$ and $\beta>0$.

According to the experimental data demonstrated in FIG. 5B, the Force-Deflection curve has three phases, as discussed above. The first two phases could be fit to the exponential function based on the Dahl model, while the last phase is a linear function. Based on this hypothesis, a control model for Force-Deflection relation of a single finger under different pressures is developed as:

$$F(x) = \begin{cases} a(p)\left(1 - e^{-b(p)x}\right) & 0 \le x \le x_1(p) \\ c(p)x + d(p) & x > x_1(p) \end{cases} \quad (11)$$

where $x_1(p)$ is the turning point from phase 2 (transition) to phase 3 (slip), and a(p), b(p), c(p), d(p) are coefficients of the piece-wise function. Parameters a(p), b(p), and $x_1(p)$ are obtained by fitting the experimental data with cubic polynomials, written as:

$$x_1(p)=0.000134p^3-0.0426p^2+0.9402p+1.4490 \quad (12a)$$

$$a(p)=-0.000879p^3-0.0165p^2+0.9048p+0.2448 \quad (12b)$$

$$b(p)=-0.000651p^3+0.0209p^2-0.2282p+1.0681 \quad (12c)$$

The parameters c(p) and d(p) for the slipping phase 3 can be obtained by applying the first and second order continuity constraints at the transition point $x_1$ for the piece wise function, written as $$c(p)=a(p)b(p)e^{-b(p)x_1(p)} \quad (12d)$$

$$d(p)=a(p)(1-e^{-b(p)x_1(p)})-a(p)b(p)x_1(p)e^{-b(p)x_1(p)} \quad (12e)$$

The curves generated from the control model under different non-zero pressures are shown as the solid black lines in FIG. 5B.

Load Capacity Test of the Entire Gripper—Test Setup

Figure 6A:
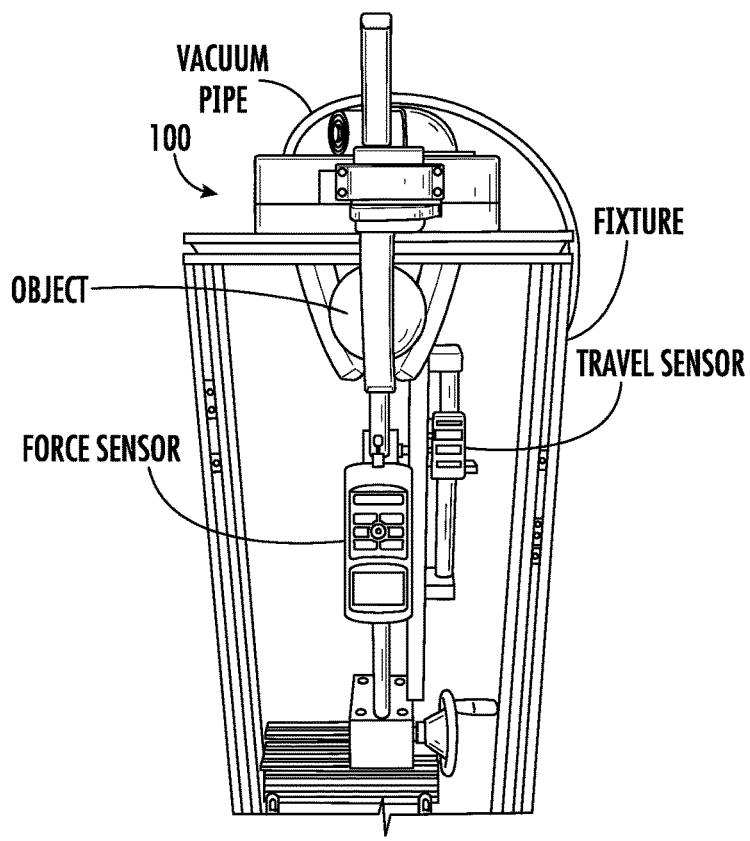
FIG. 6A is a perspective view of a test setup for determining load capacity of a gripper.

FIG. 6A shows the test setup used for the gripper load capacity test. The gripper was vertically installed to an aluminum frame. A MARK-10 force sensor and a travel sensor were assembled on a vertical slideway for measuring the force-displacement relationship. A lightweight ball of 80 mm diameter was used as the object for grasping and fixed to the end of the force sensor by a steel rod. To generate precise negative pressure inside the membrane bag, rather than the integrated pump, a vacuum pipe was used to induce the layer jamming effect. During the test, the compliant backbones were actuated at first to morph the fingers to fit to the object. Then, a certain negative pressure generated by the vacuum pipe actuated the layer jamming effect and hardened each finger. By turning the crank handle of the slideway, the two sensors were moved downward slowly and a tension force in the rod was applied to drag the object out of the gripper. Force data was recorded every 1 mm after 10 second sample time over a total 20 mm displacement, and three repeated experiments were carried out for each pressure. The force-displacement relationship was measured under six different pressures including {0, 2.5, 5, 7.5, 10, 12.5} psi to test the load capacity and stiffness increase.

Load Capacity Test of the Entire Gripper—Analysis of Test Results

Figure 6B:
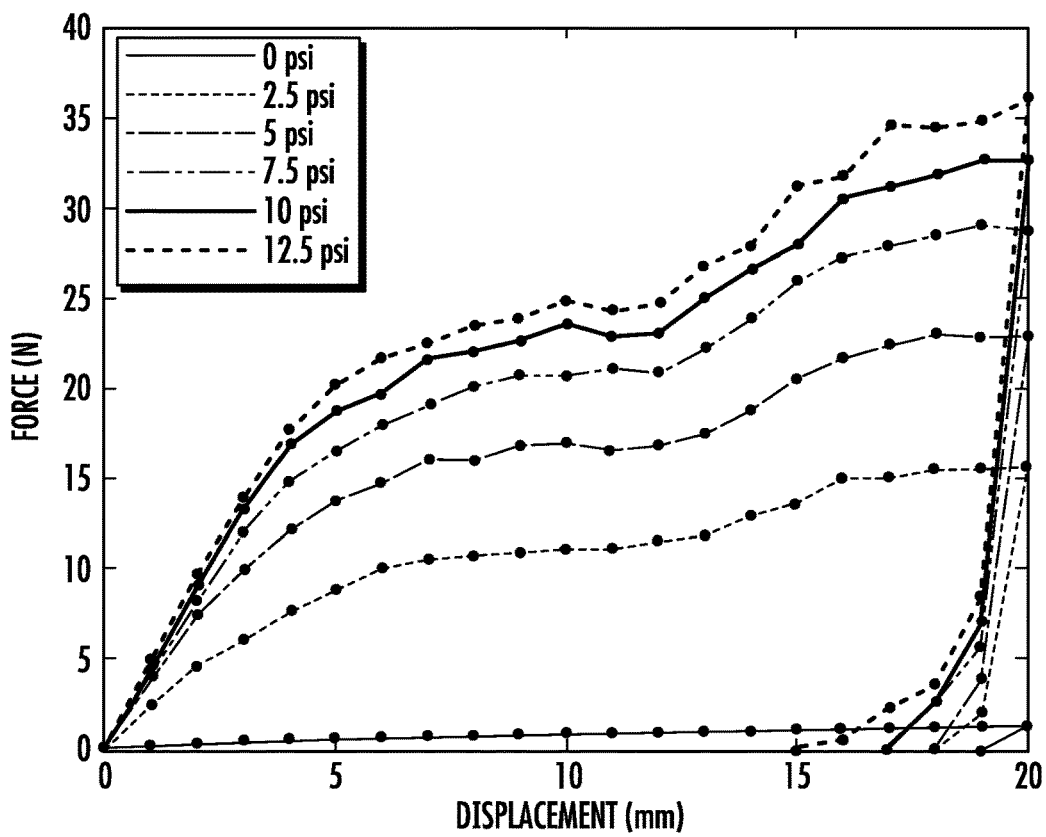
FIG. 6B is a graph illustrating force as a function of displacement for a gripper.

The experimental data of the gripper load capacity test is shown in FIG. 6B. According to the curve, the behavior of the gripper under non-zero pressure consists of three phases: a pre-slipping phase, a transition phase, and a slipping phase, which meets the characteristic of a single finger. Within the pre-slipping phase, where displacement is small, the curve is in a linear pattern. Once the force reaches the initial force of in the transition region, the overall stiffness of gripper decreases, and the gradient of the curve goes down gradually. However, in the slipping phase, the gripping force first converges to a certain value, then the slope of the curve increases and decreases again, and finally the force stays at a higher value. The gripping force consists of two parts: a normal force on contact surfaces of each finger, and a frictional force. At the start of movement, the normal force is predominant, and friction is static, which leads the curve to follow the same mode as a single finger. As displacement increases, the normal force reaches an upper limit while the frictional force keeps increasing to maintain the grasp. At around 12 mm of displacement, the angle of the finger reaches the angle of friction, which means the object starts to slip relative to the finger and the contact point moves downward. For a new touch point, the threshold of normal force increases, and thus force can grow with displacement until it gets to a higher limit.

Two important criteria to judge performance of the gripper are initial or primary stiffness and load capacity. Higher primary stiffness promises a more stable and firmer grasp under external force or impact. With respect to the gripper tested, the counteractive force has two or more thresholds, and the force around 20 mm was chosen as the load capacity of the gripper. For each pressure tested, the stiffness of the pre-slipping phase and the average force in the slip phase are listed in Table. 2.

TABLE 2

| Pressure (psi) | Primary Stiffness (N/mm) | Load Capacity (N) |
| --- | --- | --- |
| 0 | 0.14 | 1.18 |
| 2.5 | 2.34 | 15.51 |
| 5 | 3.94 | 22.90 |
| 7.5 | 4.33 | 28.74 |
| 10 | 4.61 | 32.38 |
| 12.5 | 4.75 | 35.09 |

From FIG. 6B and Table 2, the non-slipping stiffness of the non-zero pressure group increases with pressure. The enhanced initial stiffness conforms to the results of the single finger test and indicates that rigidity of the gripper could be significantly increased via the layer jamming technique. In addition, the load capacity has a positive relationship with given pressure, which also agrees with the single finger testing results. A 34-fold increase was observed for the initial stiffness of the gripper from 0.14 N/mm (p=0) to a maximum 4.75 N/mm (p=12.5 psi). Load capacity increased from 1.18 N (p=0) to 35.09 N (p=12.5 psi). The load capacity of the gripper depends on the pressure that enables the jamming effect, and the higher the pressure is, the higher load the gripper can bear.

The stiffness ratio is given by dividing pressurized stiffness by non-pressurized stiffness. For the zero-pressure case of the gripper, unlike the single finger experiment in which the force was applied perpendicular to the vacuum bag, the object was pulled downwards and frictional force between the object and the vacuum bag significantly increases the stiffness of the gripper because the antagonistic force in the backbone is relatively small. The increase in stiffness of the unjammed gripper results in a smaller increase ratio of the gripper's stiffness.

Other Illustrative Fingers for Compliant Robotic Gripper

Referring now to FIGS. 7A-7E, a finger 710 for a compliant robotic gripper in accordance with one or more embodiments of the disclosure is depicted. In some embodiments, the finger 710 of FIGS. 7A-7E may be used with the gripper 100 of FIG. 1A instead of the finger 110 described above and shown in FIGS. 1A-1M. Certain similarities and differences between the fingers 710, 110 of FIGS. 7A-7E and FIGS. 1A-1M will be appreciated by one of ordinary skill in the art from the drawings. Particular differences relate to the structure and configuration of the finger's backbone, as described below.

Figure 7A:
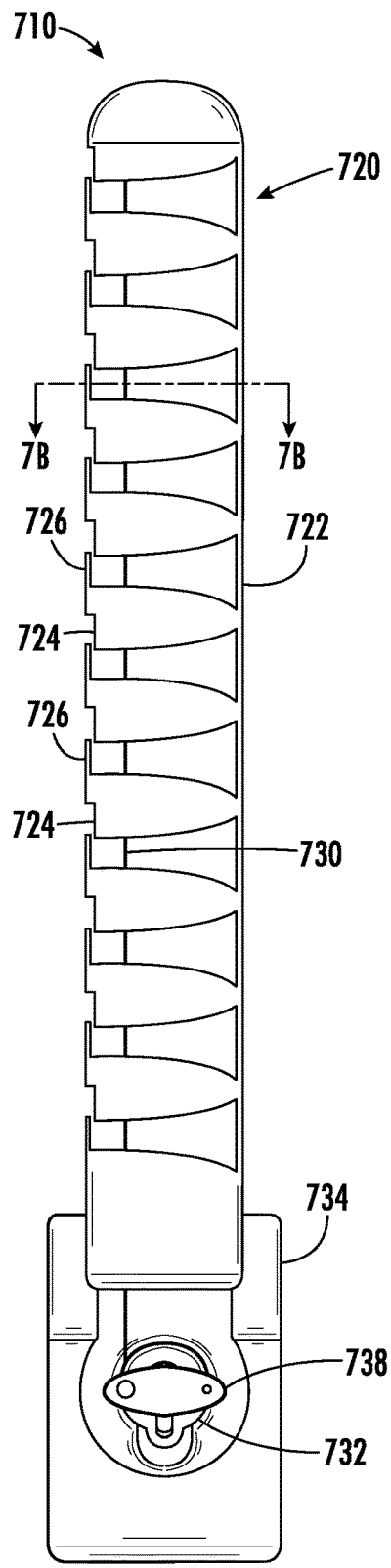
FIG. 7A is a plan view of a portion of a finger for a gripper in accordance with one or more embodiments of the disclosure, as may be used with the gripper FIG. 1A, showing a backbone, a servo motor, a servo holder, and a cable of the finger.

As shown in FIG. 7A, the finger 710 may include a skeleton 712 having a flexible backbone 720, a cable 730, a servo motor 732, and a servo holder 734. The finger 710 also may include a plurality of jamming layers and a membrane bag, which generally may be configured in a manner the same as or similar to the jamming layers 140 and the membrane bag 150 described above and have been omitted from FIG. 7A for illustration purposes. The backbone 720 may include a flexible beam 722 and a plurality of branches 724 attached to the flexible beam 722 and spaced apart from one another. As compared to the finger backbone 120 described above, the flexible beam 722 of the backbone 720 may be offset from the central axis of the backbone 720. For example, the flexible beam 722 may extend along one side of the backbone 720, as shown in FIGS. 7A-7E. In this manner, each of the branches 724 may extend from the flexible beam 722 to an opposite side of the backbone 720. As shown, the end surfaces of the branches 724 may extend along the remaining pair of opposite sides of the backbone 720 and may define end profiles having curved edges. For example, the end surfaces of the branches 724 may define end profiles having a semi-elliptical shape. As shown, the flexible beam 722 and the branches 724 may be integrally formed with one another, such as by 3D printing or other manufacturing techniques. FIGS. 7A-7E show a shape and example dimensions of the backbone 720 in accordance with certain embodiments, although other shapes, dimensions, and dimensional relationships may be used in other embodiments.

Figure 7B:
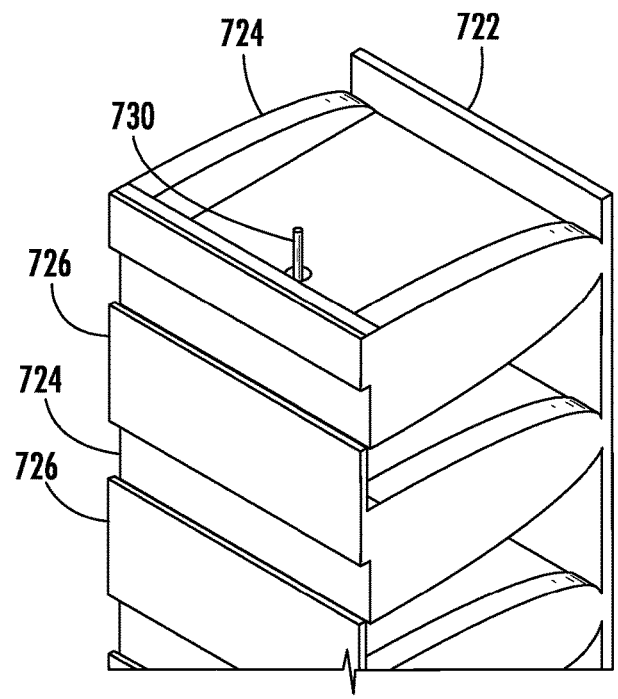
FIG. 7B is a cross-sectional perspective view of a portion of the finger of FIG. 7A, showing the backbone and the cable.
Figure 7C:
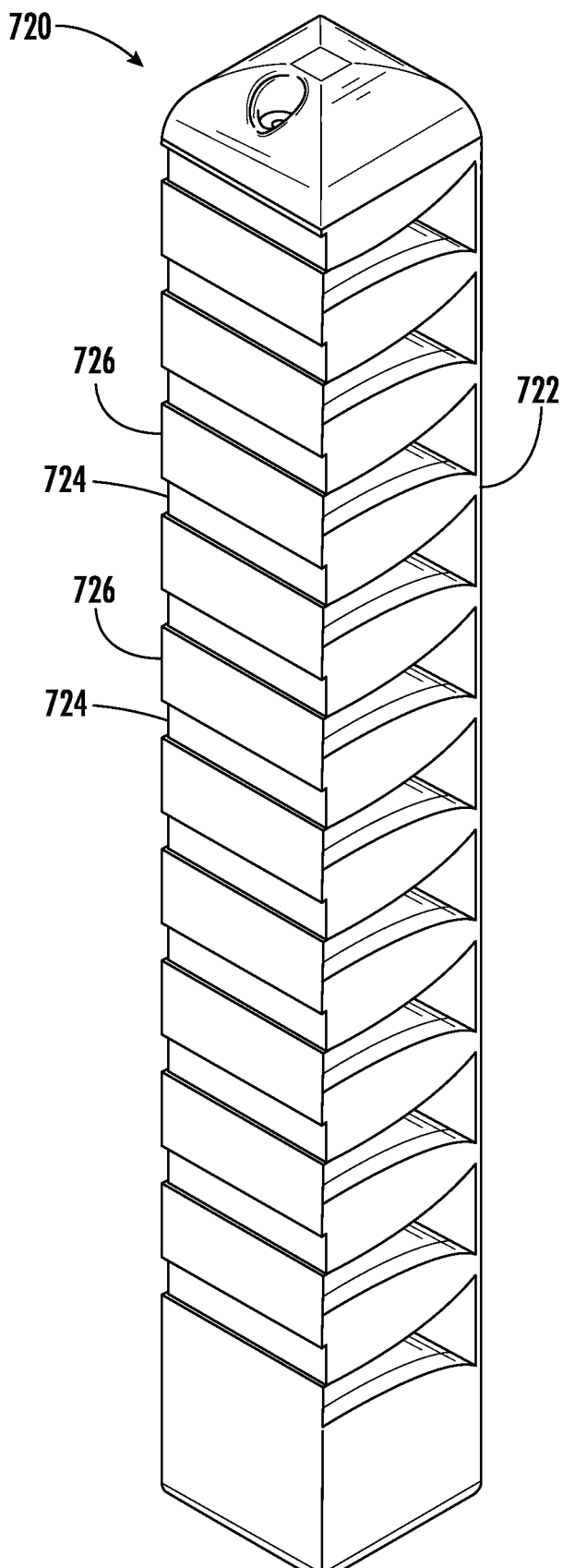
FIG. 7C is a perspective view of the backbone of the finger of FIG. 7A.
Figure 7D:
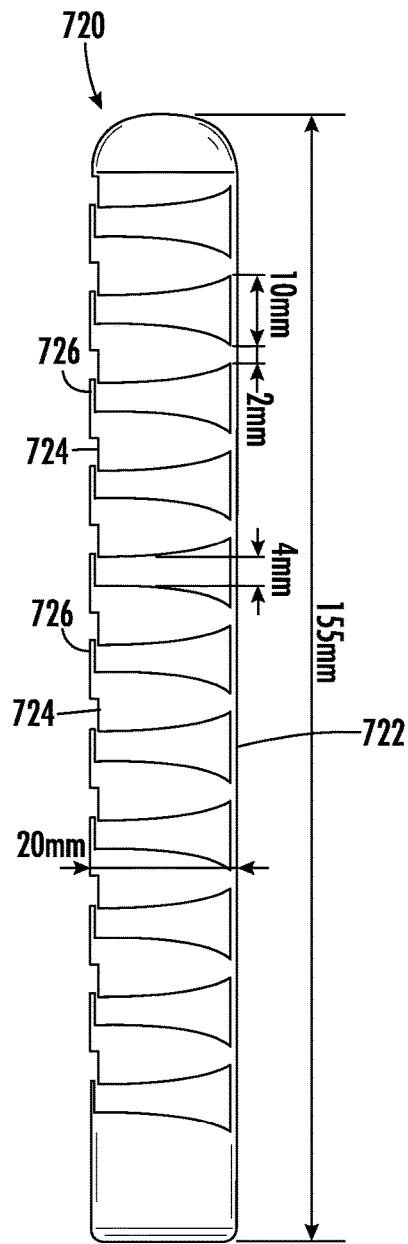
FIG. 7D is a plan view of the backbone of the finger of FIG. 7A, showing the backbone in a linear configuration.

As shown in FIGS. 7A and 7B, the finger 710 may include only a single cable 730 that extends through each of the branches 724 and is coupled at one end to a top portion of the backbone 720 and at an opposite end to the servo motor 732 via a servo horn 738. The cable 730 may be offset from the central axis of the backbone 720 and positioned closer to the side opposite the flexible beam 722. In this manner, upon activation of the servo motor 732, the cable 730 may facilitate bending of the backbone 720 in the direction away from the flexible beam 722 from a linear configuration (which also may be referred to as an "I" shape for pinching an object), as shown in FIGS. 7A-7D, to a curved configuration (which also may be referred to as a "C" shape for wrapping around), as shown in FIG. 7E.

Figure 7E:
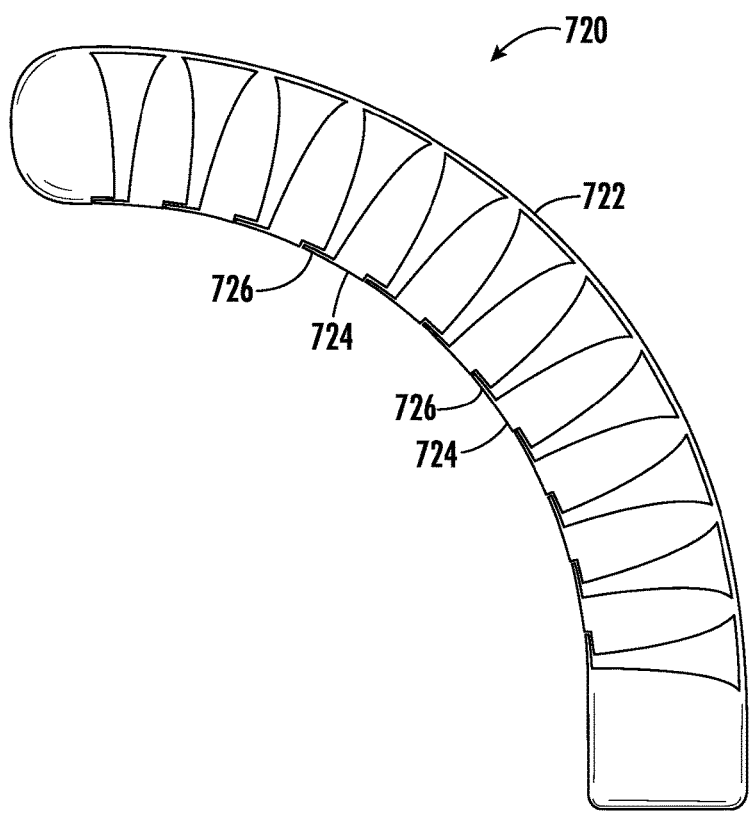
FIG. 7E is a plan view of the backbone of the finger of FIG. 7A, showing the backbone in a curved configuration.

Another feature of the backbone 720 of FIGS. 7A-7E relates to a plurality of tabs or flaps 726 that are attached to the respective branches 724. As shown, the tabs 726 may be attached to the respective side surfaces of the branches 724 along the side of the backbone 720 opposite the flexible beam 722. Each of the tabs 726 may be attached to the side surface of one of the branches 724 and may overlap a first portion of the side surface of an adjacent one of the branches 724 when the backbone 720 is in the linear configuration, as shown in FIGS. 7A-7D. When the backbone 720 is moved to the curved configuration, as shown in FIG. 7E, each of the tabs 726 may overlap a second portion of the side surface of the adjacent one of the branches 724, with the second portion being greater than the first portion. In other words, the extent of overlap provided by each of the tabs 726 may increase as the backbone 720 is moved from the linear configuration to the curved configuration. In this manner, the tabs 726 may inhibit the membrane bag from becoming trapped between adjacent branches 724 when negative pressure is applied to the finger 710. In some embodiments, the flexible beam 722, the branches 724, and the tabs 726 may be integrally formed with one another, such as by 3D printing.

Referring now to FIGS. 8A-8B, a finger 810 for a compliant robotic gripper in accordance with one or more embodiments of the disclosure is depicted. In some embodiments, the finger 810 of FIGS. 8A-8B may be used with the gripper 100 of FIG. 1A instead of the finger 110 described above and shown in FIGS. 1A-1M. Certain similarities and differences between the fingers 810, 110 of FIGS. 8A-8B and FIGS. 1A-1M will be appreciated by one of ordinary skill in the art from the drawings. Particular differences relate to the finger 810 being pneumatically-driven (instead of cable-driven) and the structure and configuration of the finger's backbone to facilitate pneumatic actuation, as described below.

As shown, the finger 810 may include a skeleton 812 having a flexible backbone 820 and a pair of membrane bags 850 each containing a plurality of jamming layers 840 therein. The backbone 820 may include a flexible beam 822 and a plurality of branches 824 attached to the flexible beam 822 and spaced apart from one another. As shown, the flexible beam 822 may be centered along the central axis of the backbone 820, although offset configurations may be used in other embodiments. One of the membrane bags 850 may be positioned along one side of the backbone 820, and the other membrane bag 850 may be positioned along the opposite side of the backbone 820. As shown, the end surfaces of the branches 824 may extend along the remaining pair of opposite sides of the backbone 820. In some embodiments, as shown, the end surfaces of the branches 824 may define end profiles having a generally trapezoidal shape, which may maximize a bending angle of the backbone 820 and reduce interference between the branches 824 as compared to other end-profile shapes. As shown, the flexible beam 822 and the branches 824 may be integrally formed with one another, such as by 3D printing or other manufacturing techniques. FIGS. 8A-8B show a shape and example dimensions of the backbone 820 in accordance with certain embodiments, although other shapes, dimensions, and dimensional relationships may be used in other embodiments.

According to the illustrated embodiment, the backbone 820 also may include a plurality of connectors 826 configured for engaging with a mating plurality of connectors 828 attached to the respective membrane bags 850. As shown, one of the connectors 826 extends from a respective side surface of each of the branches 824, although other arrangements of the connectors 826 may be used. As shown, the connectors 828 may be spaced apart along the respective membrane bag 850 to correspond to the spacing of the connectors 826 of the backbone 820. In some embodiments, as shown, the connectors 826 may be formed as protrusions having an hour-glass shape, and the connectors 828 may be formed as generally "C" shaped clips defining receptacles for receiving mating portions of the connectors 826 therein. Various other shapes and configurations of the connectors 826, 828 may be used in other embodiments. In some embodiments, the connectors 826, 828 may provide a releasable connection. For example, the connectors 828 may be configured for sliding onto and off of the connectors 826. In other embodiments, fixed or permanent connections between the backbone 820 and the membrane bags 850 may be used, which may be provided by connectors, adhesives, or other means for mechanical attachment.

To facilitate pneumatic actuation of the finger 810, the backbone 820 may include one or more channels or cavities 830 defined within one or more of the branches 824 thereof. In some embodiments, as shown, the backbone 820 may include a plurality of the channels 830. As shown, the channels 830 may be in fluid isolation from one another (i.e., not in fluid communication with one another). In some embodiments, one of the channels 830 may be defined entirely within one of the branches 824. In some embodiments, one of the channels 830 may be defined within multiple of the branches 824, such as two (2), three (3), four (4), or more of the branches 824. In other words, one of the channels 830 may extend into more than one of the branches 824. In some embodiments, each of the branches 824 may have one of the channels 830 defined or extending therein. In other embodiments, some of the branches 824 may have one of the channels 830 defined or extending therein, while a reminder of the branches 824 may be devoid of any of the channels 830 defined or extending therein. As shown, the backbone 820 also may include one or more openings 832, with each opening 832 being in fluid communication with a respective channel 830. In other words, the number of the openings 832 may correspond to the number of the channels 830. As shown, each of the channels 830 may be enclosed within the backbone 820 except for the respective opening 832 extending through the wall of the backbone 820. The finger 810 also may include a plurality of tubes 834, with each tube 834 being attached at one end to the backbone 820 and in fluid communication with a respective opening 832 and a respective channel 830. Accordingly, the number of the tubes 834 may correspond to the number of the openings 832 and the number of the channels 830. The opposite ends of the tubes 834 may be in fluid communication with one or more vacuum pumps for application of negative pressure or positive pressure to the respective channels 830. Further, the finger 810 may include a plurality of tubes 852, with each tube 852 being attached at one end to a respective membrane bag 850 and in fluid communication with the interior of the membrane bag 850. The opposite ends of the tubes 852 may be in fluid communication with one or more vacuum pumps for application of negative pressure to the interior of the respective membrane bag 850.

Similar to the finger 110 described above, the finger 810 has two modes: a flexible mode and a locked mode. In the flexible mode, bending of the backbone 820 may be achieved by applying negative pressure or positive pressure to one or more of the channels 830 via the respective tube(s)

834. In particular, such pressure may be applied to one or more of the channels 830, while pressure is not applied other channels 830, such that the backbone 820 assumes a desired shape. Based on selective application of pressure to certain channels 830, the backbone 820 may be bent to assume various shapes, such as an "I" shape for pinching an object, a "C" shape for wrapping around an object, or an "S" shape for pinching and wrapping around an object. In some embodiments, the finger 810 may include one or more valves for selectively controlling the application of pressure to the different channels 830 to achieve a desired shape. Once the desired shape of the finger 810 is achieved, the layer jamming effect may be activated by applying negative pressure to one or both of the membrane bags 850 via the respective tube(s) 852 to transform the finger 810 into the locked mode.

Figure 9A:
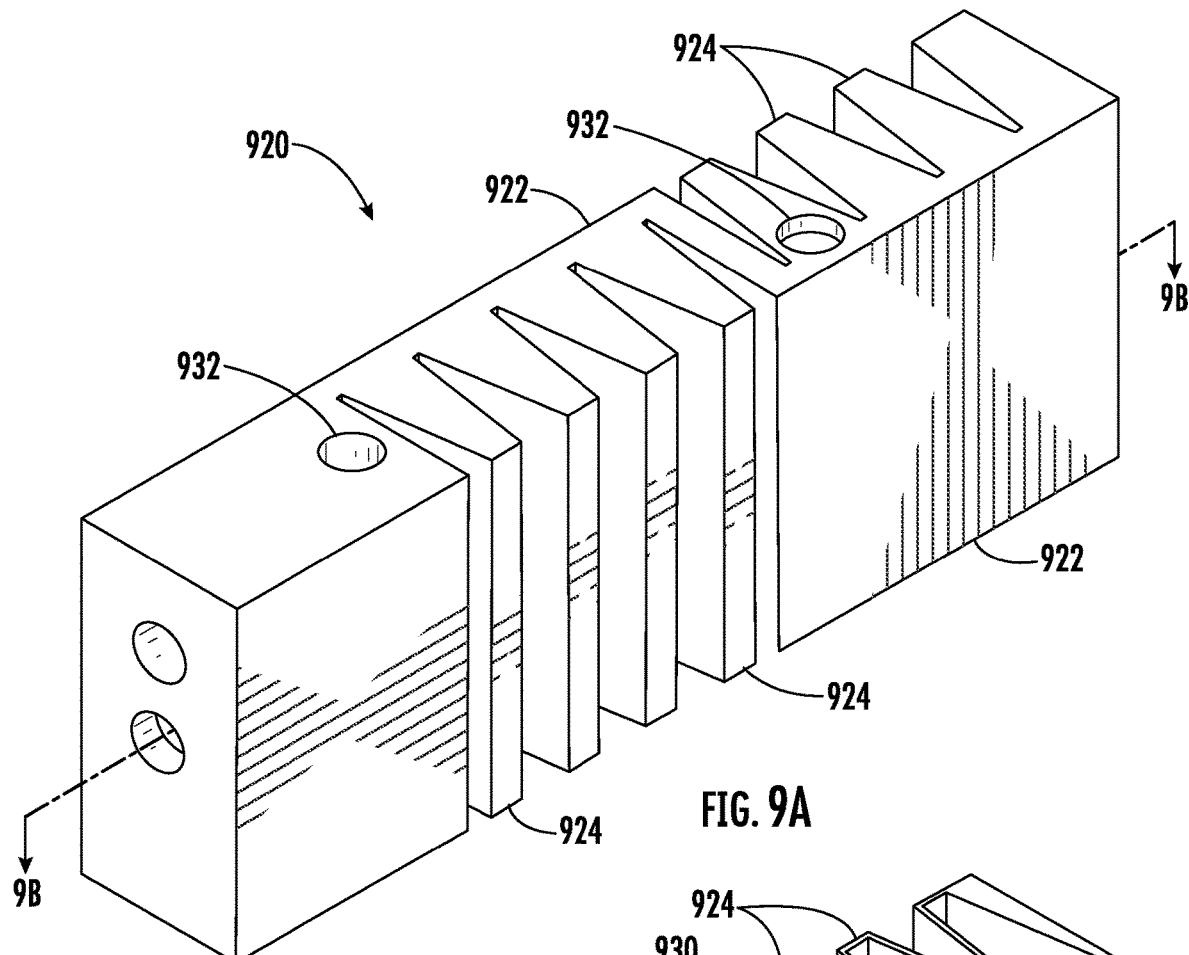
FIG. 9A is a perspective view of a backbone of a finger for a gripper in accordance with one or more embodiments of the disclosure, as may be used with the gripper FIG. 1A.
Figure 9B:
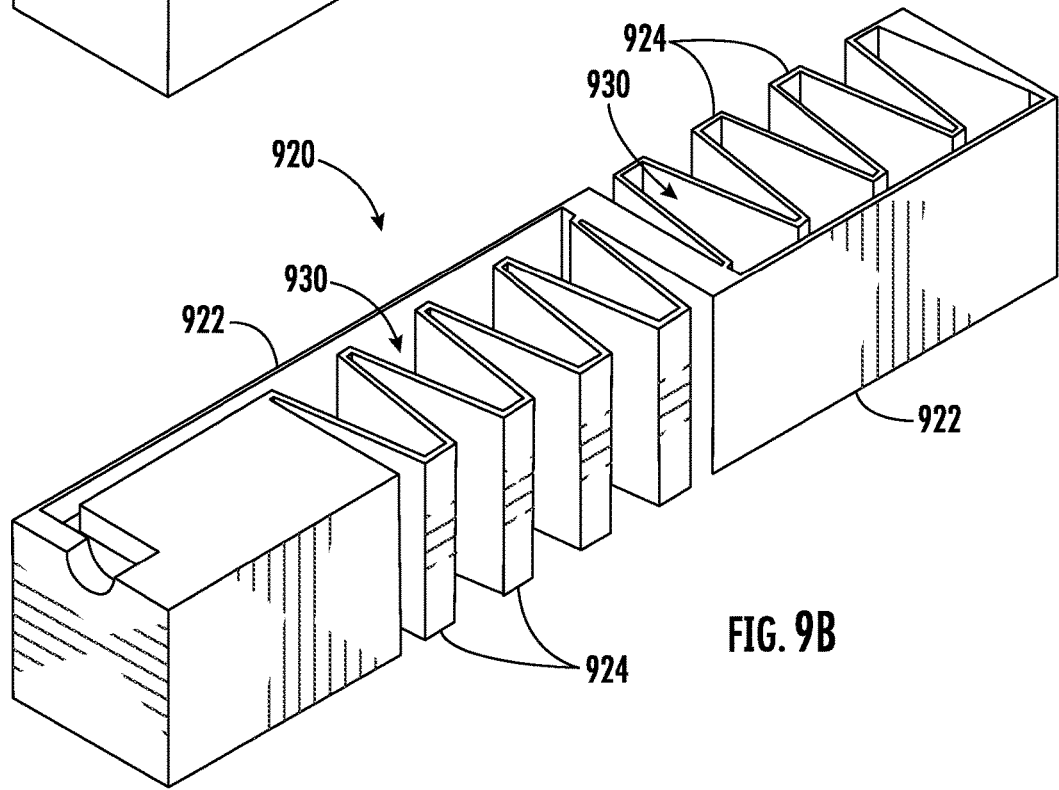
FIG. 9B is a cross-sectional perspective view of the backbone of FIG. 9A.

Referring now to FIGS. 9A-9B, a backbone 920 of a finger for a compliant robotic gripper in accordance with one or more embodiments of the disclosure is depicted. In some embodiments, the backbone 820 of FIGS. 9A-9B may be used with the gripper 100 of FIG. 1A. Similar to the backbone 820 of the finger 810 described above, the backbone 920 may be pneumatically actuated. Certain similarities and differences between the backbones 920, 820 of FIGS. 9A-9B and FIGS. 8A-8B will be appreciated by one of ordinary skill in the art from the drawings. Particular differences relate to the backbone 920 having multiple flexible beams and the configuration of the branches and the channels thereof. Similar to the backbone 820, the backbone 920 may be used with a pair of membrane bags each containing a plurality of jamming layers, which generally may be configured in the same or similar manner as the corresponding components of finger 810 described above.

As shown, the backbone 920 may include a pair of flexible beams 922 and a plurality of branches 924. One of the beams 922 may be positioned along one side of the backbone 920 and may extend along only a portion of the longitudinal extent of the backbone 920, and the other beam 922 may be positioned along the opposite side of the backbone 920 and may extend along only a portion of the longitudinal extent of the backbone 920. As shown, one of the beams 922 may extend from a first end of the backbone 920 to an intermediate portion of the backbone 920, and the other beam 922 may extend from an opposite second end of the backbone 920 to the intermediate portion of the backbone 920. In some embodiments, the beams 922 may partially overlap one another along the intermediate portion of the backbone 920. As shown, a first set of the branches 924 may extend from one of the beams 922 in a first direction, and a second set of the branches 924 may extend from the other beam 922 in an opposite second direction. FIGS. 9A-9B show a shape and example dimensions of the backbone 920 in accordance with certain embodiments, although other shapes, dimensions, and dimensional relationships may be used in other embodiments.

To facilitate pneumatic actuation, the backbone 920 may include one or more channels 930 defined within one or more of the branches 924 thereof. In some embodiments, as shown, the backbone 920 may include two (2) channels 930, with a first channel 930 being defined in the first set of branches 924, and a second channel 930 being defined in the second set of branches 924. As shown, the backbone 920 also may include a pair of openings 932 in fluid communication with the respective channels 930 to facilitate application of negative pressure or positive pressure to the channels 930. Based on selective application of pressure to the channels 930, the backbone 920 may be bent to assume various shapes, such as an "I" shape for pinching an object, a "C" shape for wrapping around an object, or an "S" shape for pinching and wrapping around an object. Once the desired shape of the backbone 920 is achieved, the layer jamming effect may be activated by applying negative pressure to one or both of the membrane bags to transform the finger into the locked mode.

Although certain configurations of fingers for a compliant robotic gripper are described herein and depicted in the drawings, it will be appreciated that other arrangements and configurations of the fingers may be used in accordance with various embodiments of the disclosure.

SUMMARY

The present disclosure thus provides an improved compliant robotic gripper with variable stiffness developed by integrating a layer jamming technique and a cable-driven actuator. Example designs and fabrication processes for the gripper are described herein. As discussed above, an analytical model based on the pseudo-rigid-body method was developed for predicting deflection of a single finger under actuation force, and a series of experimental tests of individual fingers and the entire gripper were conducted. The initial stiffness of a single finger achieved a 180-fold increase and proved to hold before an external force was raised to a critical value that has a positive correlation with given pressure. An exponential control model for the stiffness of a single finger was constructed on the basis of test data. The overall stiffness and load capacity of the gripper were measured, and a 34-fold increase and a 30-fold increase were observed, respectively, with the layer jamming effect. Development of an analytical model of fingers stiffness based on friction of layers may allow for a comprehensive understanding and optimization of the structure. Also, a more sophisticated model for calculating the actuation force for both with and without layer jamming may be used in order to more accurately control the gripper and achieve better performance.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms which may be used interchangeably herein.

What is claimed is:

1. A finger for a robotic gripper, the finger comprising:
a flexible backbone having a first end, a second end positioned opposite the first end, a first side, a second side positioned opposite the first side, a third side, and a fourth side positioned opposite the third side, the backbone comprising:
a flexible beam extending in a direction from the first end toward the second end of the backbone; and
a plurality of branches attached to the flexible beam and spaced apart from one another, each branch comprising:
a first end surface extending along the first side of the backbone;
a second end surface extending along the second side of the backbone; and
a side surface extending along the third side or the fourth side of the backbone;
wherein the first end surfaces of the branches collectively extend along a majority of the first side of the backbone; and
wherein the second end surfaces of the branches collectively extend along a majority of the second side of the backbone;
a plurality of jamming layers positioned along the third side or the fourth side of the backbone and extending over respective side surfaces of the branches; and
a tubular membrane bag positioned over and extending around the jamming layers.

2. The finger of claim 1, wherein the first end surfaces and the second end surfaces of the branches each define an end profile having one or more curved edges.

3. The finger of claim 1, wherein the first end surfaces and the second end surfaces of the branches each define an end profile having a semi-elliptical shape.

4. The finger of claim 1, wherein the first end surfaces of the branches collectively extend along at least 70% of the first side of the backbone, and wherein the second end surfaces of the branches collectively extend along at least 70% of the second side of the backbone.

5. The finger of claim 1, wherein the flexible beam and the branches are integrally formed with one another.

6. The finger of claim 1, wherein the flexible beam is centrally positioned between the third side and the fourth side of the backbone.

7. The finger of claim 6, wherein the plurality of branches comprises:
a first set of branches each extending from the flexible beam to the third side of the backbone; and
a second set of branches, each branch extending from the flexible beam to the fourth side of the backbone.

8. The finger of claim 1, wherein the flexible beam is offset toward the third side or the fourth side of the backbone.

9. The finger of claim 1, wherein the flexible beam extends along one of the third side or the fourth side of the backbone.

10. The finger of claim 9, wherein the branches each extend from the flexible beam to the other of the third side or the fourth side of the backbone, and wherein the jamming layers each are positioned along the other of the third side or the fourth side of the backbone.

11. The finger of claim 1, further comprising:
a cable extending through each of the branches; and
a servo motor coupled to the cable.

12. The finger of claim 1, wherein the membrane bag is further positioned over and extends around the backbone, which is coupled to an airtight holder,
wherein a hermetic seal is formed between the membrane bag and the airtight holder,
wherein the membrane bag defines an interior region configured to receive a negative pressure.

13. The finger of claim 1, wherein the first end surfaces and the second end surfaces of the branches each define an end profile having a trapezoidal shape.

14. The finger of claim 1, wherein the membrane bag is positioned along the third side or the fourth side of the backbone, and wherein the membrane bag is connected to the backbone by a plurality of first connectors of the backbone and a plurality of second connectors attached to the membrane bag.

15. The finger of claim 1, further comprising:
a tube attached to the membrane bag and in fluid communication with an interior of the membrane bag; and
a vacuum pump attached to the tube and configured for applying negative pressure to the interior of the membrane bag to increase frictional forces between the jamming layers.

16. The finger of claim 1, wherein the backbone further comprises:
one or more channels defined within one or more of the branches; and
one or more openings extending through the backbone and in fluid communication with the one or more channels.

17. The finger of claim 16, further comprising one or more tubes attached to the backbone and in fluid communication with the one or more channels.

18. The finger of claim 17, further comprising one or more vacuum pumps attached to the one or more tubes and configured for applying negative pressure or positive pressure to the one or more channels to bend the backbone.

19. The finger of claim 16, wherein the one or more channels comprises:
a first channel defined in a first branch extending from the flexible beam to the third side of the backbone; and
a second channel defined in a second branch extending from the flexible beam to the third side of the backbone, wherein the second channel is in fluid isolation from the first channel.

20. The finger of claim 16, wherein the one or more channels comprises:
a first channel defined in a first set of branches each extending from the flexible beam to the third side of the backbone; and
a second channel defined in a second set of branches extending from the flexible beam to the third side of the backbone, wherein the second channel is in fluid isolation from the first channel.

* * * * *